United States Patent [19]
Bos et al.

[11] Patent Number: 5,825,448
[45] Date of Patent: *Oct. 20, 1998

[54] REFLECTIVE OPTICALLY ACTIVE DIFFRACTIVE DEVICE

[75] Inventors: Philip J. Bos, Hudson; Jianmin Chen, Kent, both of Ohio; David L. Johnson, deceased, late of Kent, Ohio, by Rosine M. Johnson, executor; William E. Glenn, Ft. Lauderdale, Fla.; Carvel E. Holton, Blacksburg, Va.; Brett E. Smith, Boynton Beach, Fla.

[73] Assignee: Kent State University, Kent, Ohio

[*] Notice: The term of this patent shall not extend beyond the expiration date of Pat. No. 5,638,201.

[21] Appl. No.: 743,962

[22] Filed: Nov. 5, 1996

Related U.S. Application Data

[63] Continuation-in-part of Ser. No. 445,051, May 19, 1995, Pat. No. 5,638,201.

[51] Int. Cl.⁶ .................................................. G02F 1/1337
[52] U.S. Cl. .......................................... 349/128; 349/130
[58] Field of Search .................................... 349/127, 126, 349/128, 129, 130

[56] References Cited

U.S. PATENT DOCUMENTS

| 5,309,264 | 5/1994 | Lien et al. | 359/77 |
| 5,473,455 | 12/1995 | Koike et al. | 359/78 |
| 5,504,604 | 4/1996 | Takatori et al. | 359/75 |

FOREIGN PATENT DOCUMENTS

| 106624 | 4/1988 | Japan . | |
| 88520 | 11/1989 | Japan . | |
| 273509 | 11/1990 | Japan . | |
| 5-173138 | 7/1993 | Japan | 359/78 |
| 5-203951 | 8/1993 | Japan | 359/77 |

OTHER PUBLICATIONS

"JID–Crystal Orientation on D SiO Films at 60° incidence", Proceedings of the SID, vol. 25/4, 1984, pp. 287, 292, authored by K. Hiroshima and H. Obi.

"44.2: Analytical Simulation of Electro–Optical Performance of Amorphous and Multidomain TN–LCDs", pp. 919–922, SID 1994 Digest, Stanley Electric Co., Ltd.

"44:1 Invited Address: Electro–Optical Characteristics of Amorphous and Super–Multidomain TN–LCDs Prepared by a Non–Rubbing Method", pp. 915–918, SID 1994 Digest, Tokyo Univ. of Agriculture & Technology.

"Liquid Crystals—Applications and Uses", World Scientific, vol. 3, pp. 44–55, 244–259, and 279–281, copyright 1992.

"Controlled High–Tilt–Angle Nematic Compatible with Glass Frit Sealing", published 1982, pp. L761–L763, Department of Electronics, Faculty of Engineering, Yamanashi University.

(List continued on next page.)

Primary Examiner—William L. Sikes
Assistant Examiner—James Dudek
Attorney, Agent, or Firm—Renner, Kenner, Greive, Bobak, Taylor & Weber

[57] ABSTRACT

A reflective liquid crystalline diffractive light valve for use in a diffractive projection system. The liquid crystal cell includes a transparent substrate and a reflective substrate treated to provide alternating stripes which cooperate with the liquid crystal to form liquid crystal domains extending across the thickness of the cell that will produce an appropriate phase difference in light reflected by the cell, irrespective of the polarization of incident light. The techniques embodied in the present invention are applicable to the creation of electrically controllable diffractive optical elements for ray optic, integrated optic or fiber optic utilization operated in either transmission or reflection. Diffractive patterns may be lithographically, holographically or interferometrically generated.

58 Claims, 6 Drawing Sheets

OTHER PUBLICATIONS

"New Development in Alignment Layers for Active Matrix TN–LCDs", pp. 78–85, Faculty of Technology, Tokyo University of A&T,International Display Research Conference (IDRC) Oct., 1994.

"Tilted Homeotropic Alignment of Liquid–Crystal Molecules/Using the Rubbing Method", Mol. Cryst. Liq. Cryst. 1991, vol. 199, pp. 151–158, copyrighted 1991.

"35.7: Full–Cone Wide–Viewing–Angle Multicolor CSH–LCD", Stanley Electric Co., Ltd., SID 1991 Digest, pp. 762–765.

"Two–Domain 80°–Twisted Nematic Liquid Crystal Display for Grayscale Applications", Japan J. Appln. Phys. vol. 31 (1992) pp. L1603–L1605.

"The Symmetry Property of a 90°Twisted Nematic Liquid Crystal Cell", Mol. Cryst. liq. Cryst., 1991, vol. 198, pp. 37–49.

"Three–Dimensional Simulation of Multi–Domain Homeotropic Liquid Crystal Cell", Japan J. Appl. Phys. vol. 33 (1994) pp. 6240–6244.

"7.3: Photostable Titled–Perpendicular Alignment of Liquid Crystals for Light Valves", Hughes Research Laboratories, pp. 98–101, SID 1990 Digest.

"Multi–Domain Homeotropic Liquid Crystal Display for Active Matrix Application", IBM Research Division, pp. 21–24, IDRC, Sep., 1993.

"Amorphous Twisted Nematic–Liquid–Crystal Displays Fabricated by Nonrubbing Showing Wide and Uniform Viewing Angle Characteristics Accompanying Excellent Voltage Holding Rations", J. Appl. Phys. V. 74, N.3, 8–1–83; 2071–2075.

"Two–Domain Twisted Nematic and Tilted Homeotropic Liquid Crystal Displays for Active Matrix Applications", pp. 68–72, copyrighted 1991, IEEE.

"Polymer Stabilized Amorphous TN–LCD", pp. 484–487, Stanley Electric Co., Ltd; Dainippon Inc. & Chemicals, Inc.; and Faculty of Technology, Tokyo University, IDRC, Oct., 1994.

"35.6: Vertically Aligned Liquid–Crystal Displays", pp. 758–761, SID 1991 Digest.

"s3–3 9.4 4096 Color CSH–LCD", Stanley Electric Co., Ltd., pp. 61–64, Japan Display, dated 1992.

"s15–6 A Complementary TN LCD with Wide–Viewing–Angle Grayscale", NEC Corp., pp. 591–594, Japan Display dated 1992.

"41.5: Late–News Paper: A Full–Color TFT–LCD with a Domain–Divided Twisted–Nematic Structure", pp. 798–801 SID 1992 Digest.

"19.2: Two–Domain TN–LCDs Fabricated by Parallel Fringe Field Method", pp. 269–272, SID 1993 Digest.

"44.4: Improvement of Gray–Scale Performance of Optically Compensated Birefringce (OCB) Display mode for AMLCDs", pp. 927–930, SID 1994 Digest.

An Introduction to the Methods of Optical Crystallography, pp. 116 et seq., Bloss, dated 1992.

Gibbons, Wayne M. et al., *Optically Controlled Alignment of Liquid Crystals,* Liquid Crystals Today, vol. 4, No. 2, 1994.

M.W. Fritsch et al., *Crystals for Schlieren Optical Projection Systems,* IDRC, Sep., 1990.

Yoshikazu Hori et al., *Field–Controlled Liquid Crystal phase Grating,* IEEE Transactions on Electron Devices, vol. ED–26, No. 11, Nov. 1979.

Masaki Hasegawa and Yoichi Taira, *Nematic Homogeneous Alignment by Photo Depolymerization of Polyamide,* pp. 213–216, IDRC, Oct., 1994.

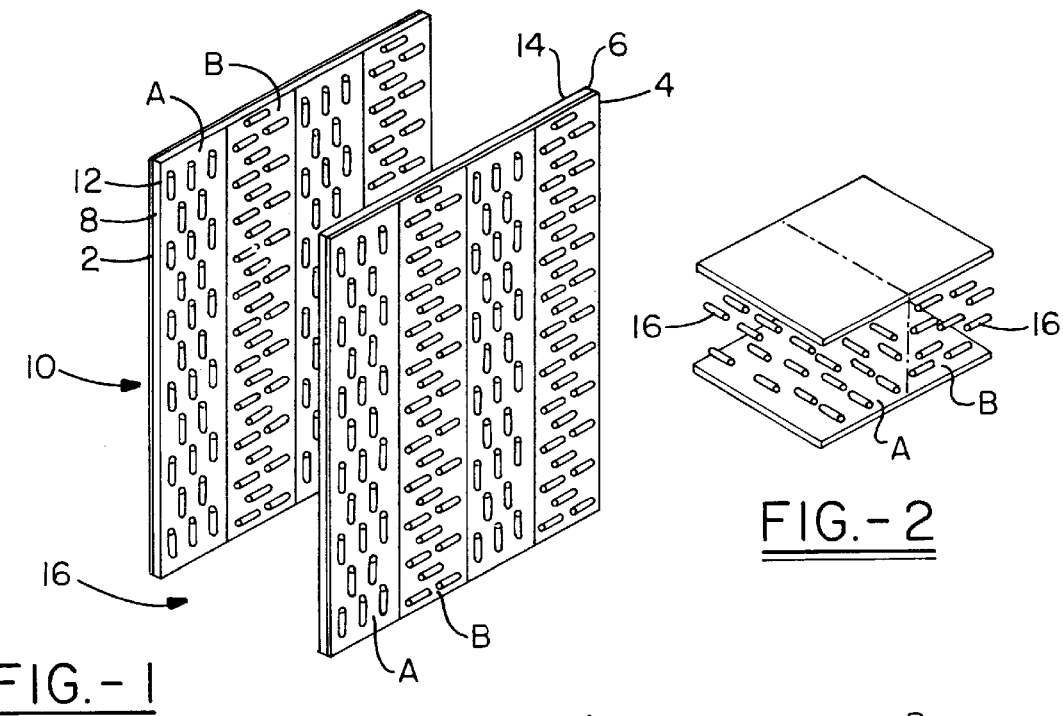
FIG.-1
FIG.-2
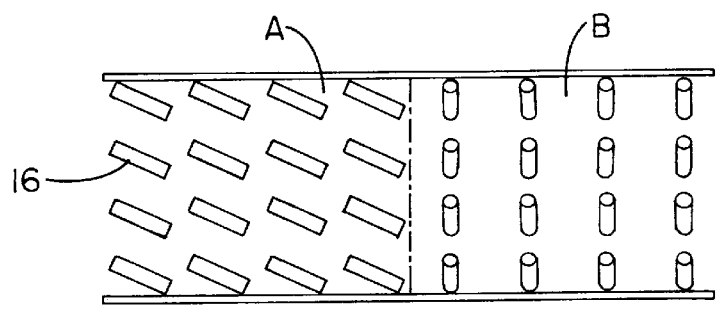
FIG.-3
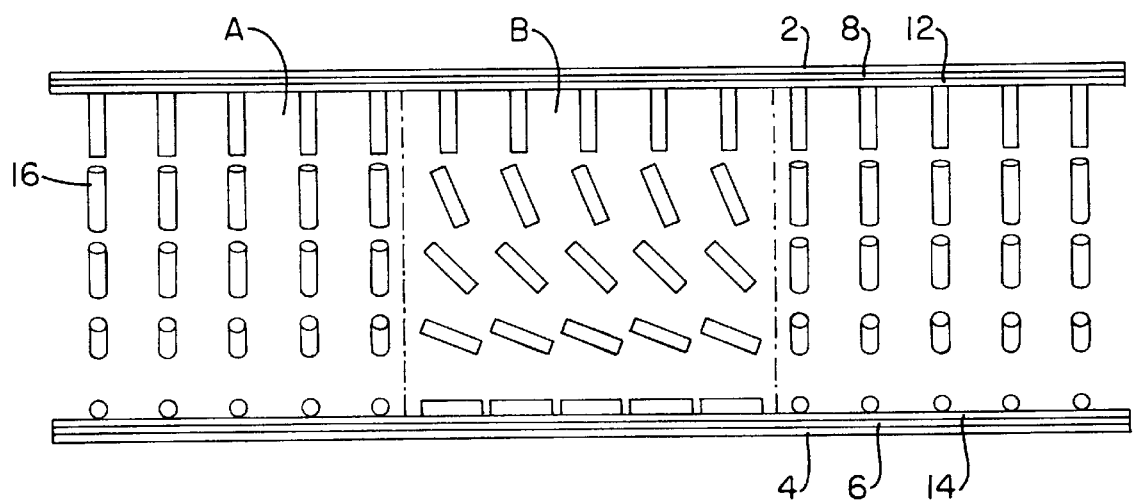
FIG.-4

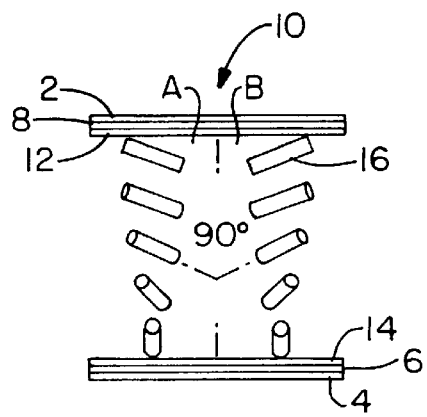 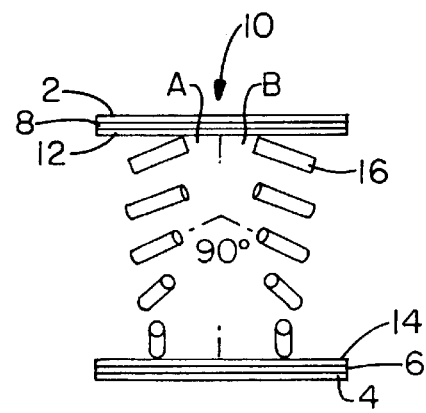
FIG.-5A  FIG.-5B
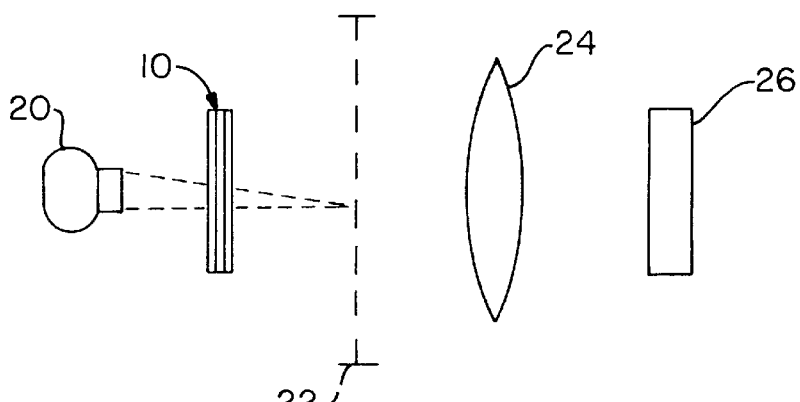
FIG.-6
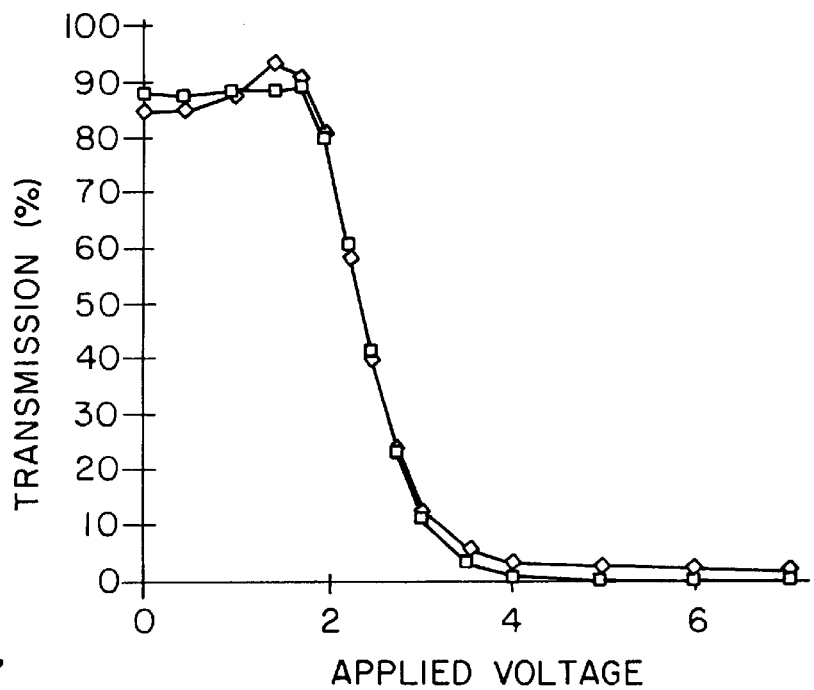
FIG.-7

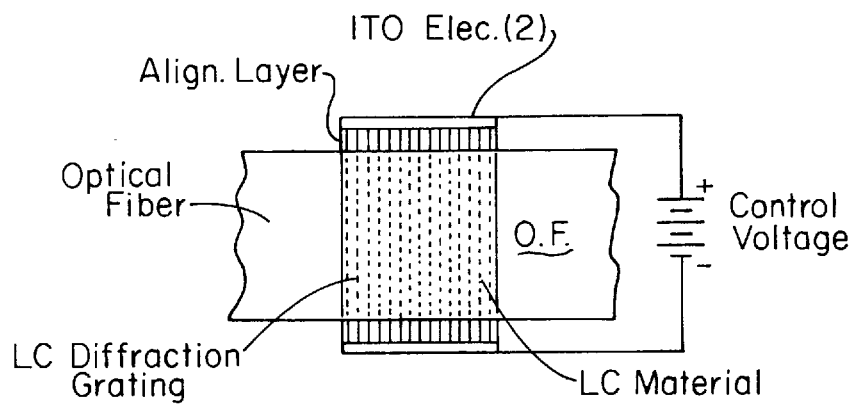
FIG.-17E   Bragg Grating Concept
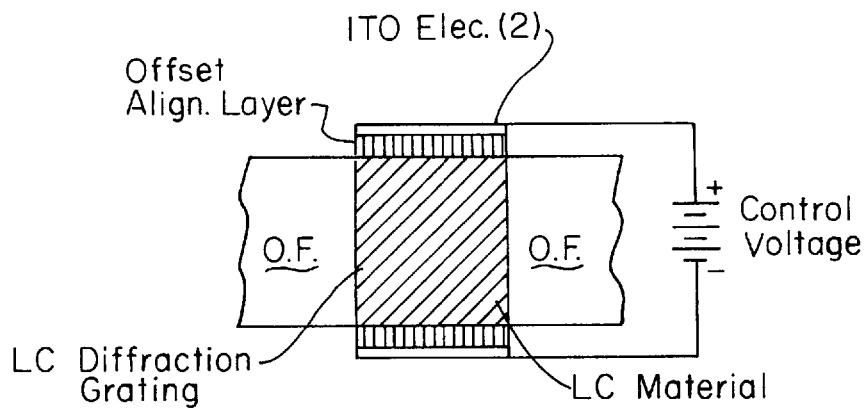
FIG.-17F   Alternate Bragg Concept
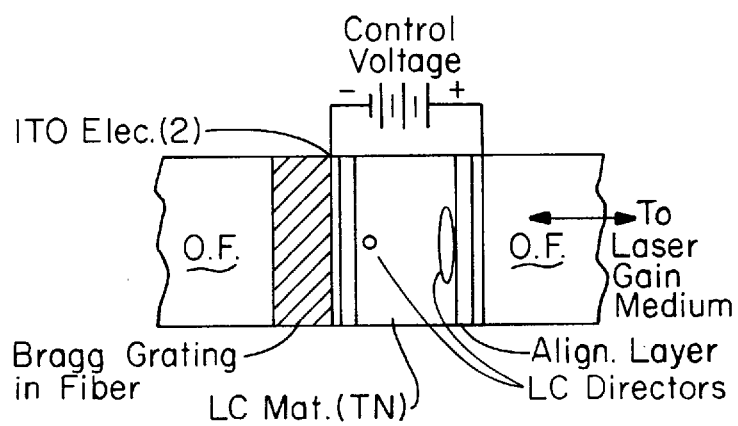
FIG.-17G   General Concept, Intra-Cavity LC

REFLECTIVE OPTICALLY ACTIVE DIFFRACTIVE DEVICE

RELATED APPLICATIONS

This is a continuation-in-part application of application Ser. No. 08/445,051 filed May 19, 1995 now U.S. Pat. No. 5,638,201 and entitled OPTICALLY ACTIVE DIFFRACTIVE DEVICE.

GOVERNMENT LICENSE RIGHTS

The U.S. Government has a paid-up license in this invention and may have the right in limited circumstances to require the patent owner to license others on reasonable terms as provided by the terms of Grant No. DMR89-20147 awarder by the National Science Foundation-ALCOM, and as provided for by the terms of Contract No. N0014-94-0272awarded by Naval Research.

BACKGROUND OF THE INVENTION

Light-valve projectors using liquid crystal panels as light modulators are an attractive way to produce large screen images. Consumer or theater high definition television displays require screen sizes in excess of about 50 inches. In order to have enough brightness to overcome ambient illumination for consumer displays of this size a light output on the order of 1000 lumens is needed, while theater sized displays require roughly 5000 to 10,000 lumens. Currently, available rotation of polarization based (ROP) low cost, light valve projectors fall short of the light output required for consumer displays, and higher priced HDTV projectors fall short of the light output required for a normal size theater. Light-valve projectors using liquid crystal cells as diffractive light valves (modulators) or diffraction gratings offer strong options for economical, bright displays of this size.

Transmissive liquid crystalline light valves for use as phase or diffraction grating modulators in projection systems require that the light passing through different regions of the liquid crystal cell exit the regions of the device out of phase. The phase differences between the light emerging from the device in different regions causes diffraction of the light into various orders, creating a pattern of bright regions at special angles, e.g., the first, second, third diffraction orders, and dark regions caused by the destructive interference of light emerging from different regions out of phase. Spatial filters such as louvers disposed between the viewing surface and the liquid crystal device then pass the selected diffraction orders of the diffraction pattern onto the projected scene, and block the zero or other unwanted orders. When the various regions of the device are divided into electrically addressable pixels, the diffraction of light through the device can be modulated to produce images.

Liquid crystalline tunable birefringence devices (TBD's) can be used to produce a diffractive light valve or diffraction grating. However, such devices in most manifestations require polarizers which inherently reduce the light transmission and are sensitive to layer thickness, wavelength and angle effects, rendering them essentially no better than a conventional twisted nematic (TN) type light valve. Twisted nematic light valve devices have also been proposed wherein the liquid crystal has a 90° and 180°twist across the cell. However, such devices exhibit only about a $\pi/2$ phase difference between ON and OFF states, such that useful efficiency can only be achieved in a reflective type display. In addition, both such approaches have the disadvantage of requiring high resolution patterned electrodes. To replace the patterned electrodes, photo-induced alignment has been considered for chirped-gratings. However, practical diffractive devices that operate at low voltages, are simple to construct, and that have high efficiencies have not been described. The transmissive modulation efficiency associated with TN cells is less than about 35%, with contrast ratios only on the order of about 100:1, and the transmissive modulation efficiency of patterned electrode diffraction devices is only about 60%, with contrast ratios on the order of 150:1.Accordingly, there is currently a need for a highly efficient liquid crystalline diffractive light valve that can be produced at low cost.

Reflective light valves also encounter many of same problems enumerated above for transmissive light valves. Current reflective external electro-optic modulators, which are based on the optical phase/polarization modulation capability of liquid crystal material, have been used for diffractive optical utilization. Unfortunately, comparatively inefficient high voltage drivers are required to operate such devices. Moreover, these devices are limited by the need to use complex patterned electrodes to drive the liquid crystal material. The patterned electrode gaps introduce aberrations into the optical element which limits the size of the picture element or pixel to which the electrode is connected. This reduces the effective usefulness and the achievable geometries of each pixel in the associated liquid crystal display. Current non-diffractive (i.e. ROP) reflective displays also require elaborate addressing hardware, provide inferior contrast ratios and may require the use of polarizers. Therefore, there is a need in the art for a highly efficient liquid crystalline reflective diffractive light valve that can be produced at low cost and that can be operated with inexpensive addressing hardware.

The transmissive and reflective displays described to this point have considerable technology in common with controllable, diffractive optical elements made to date. In these elements, electrode patterns are utilized to modulate the phase characteristics of the liquid crystal material to produce variable zoom (or focal) length lenses, scanners, fiber couplers or binary optical elements. The common problem with all previous attempts at these structures is that the insulating gaps between the driven electrodes required to generate the controlled phase patterns introduce strong aberrations into the element or parasitic diffraction which destroys the operating characteristics of the element. In this respect, these diffractive optical elements have much in common with the displays already discussed. What is necessary is a technique to be able to fully implement the interdigitated electrode patterns and gaps. Also diffractive liquid crystal optics previously produced have required the use of polarized light, which strongly limits the achievable efficiency of the optics generated.

Therefore, there is a need in the art for a highly efficient liquid crystalline reflective diffractive light valve that can be produced at low cost and that can be operated with inexpensive addressing hardware. There is also a need for controllable diffractive optical elements in ray(bulk) optics, integrated optics and fiber optics.

DISCLOSURE OF THE INVENTION

The present invention is directed to new liquid crystalline diffraction or phase gratings useful in light valve projectors. The inventive device exhibits excellent optical efficiency independent of the polarization of incident light, eliminating the need for polarizers and the associated light loss. The inventive device is also easier to manufacture than currently proposed devices and does not require high resolution patterned electrodes. As a result, the inventive device is especially suitable for use in the manufacture of large screen light valve projectors to produce bright, inexpensive large screen displays. To this end, the invention employs patterned alignment layers to create a diffractive device. In an especially preferred embodiment, the alignment layers take advantage of the property of optical activity to create a diffractive device with exceptional performance properties and simplicity of implementation.

To improve the modulation efficiency in light valve applications i.e., the percentage of transmitted light, the inventive device provides a highly efficient diffraction grating created in the area of each pixel of a liquid crystal cell. The diffraction efficiency, i.e., the amount of light diffracted into all orders, is a function of the phase shift produced by the liquid crystal device. If the phase shift between adjacent regions of the pixel is exactly $\pi$ radians, or 180°, then the pixel will in theory produce 100% diffraction efficiency with all energy diffracted into the odd orders. If the projector's output louvers or other spatial filter is designed to pass the odd orders and block the zero and even orders, the percentage of transmitted light (modulation efficiency) approaches the limit set by the diffraction efficiency. Contrast in such a system is exceptionally high. The invention provides for the economical production of pixels in which the phase shift between adjacent regions of the pixel is approximately 180° regardless of the polarization of incident light on the pixel. As a result, the device does not require polarizers. Moreover, the diffraction achieved by the inventive device is a function of the orientation of the liquid crystal induced by the treatment of the inner surfaces of the cell substrates, such that complicated patterned electrodes are not required. Thus, the means for addressing the liquid crystal may be any type known, such as transparent electrodes as are commonly formed from indium tin oxide (ITO) which may be continuous on at least one cell substrate, active matrix thin film transistors or MIM's, passive matrix and so on.

These and other advantages are achieved in accordance with the invention by providing a liquid crystal device in which the substrate surfaces are patterned into alternating domains, preferably extending in substantially parallel stripes across the light modulating portion of the device. By properly orienting the liquid crystal at the inner substrate surfaces in alternating stripes, the liquid crystal forms domains extending from one substrate to the other. Light of any given polarization incident on adjacent domains that is initially in phase will emerge from adjacent domains approximately 180° out of phase. By bounding adjacent portions of the stripes with electrodes, thin film transistors or the like to form pixels, different regions of the cell can be made to transmit or diffract light in response to various inputs. When incorporated into a projection apparatus, the device can create images. To this end, the device can be prepared to form adjacent stripes or domains effective to produce a 180° phase difference between light emerging from adjacent domains in several ways according to the invention.

In a known transmissive embodiment, the stripes essentially form a series of alternating tunable birefringence devices within the cell wherein the liquid crystals at the cell surfaces are substantially orthogonal to each other in adjacent domains. Thus, light entering adjacent domains will encounter different indices of refraction. Since the projection of the directors of the liquid crystal in a given stripe or domain are parallel across the thickness of the cell, the light will not be rotated as it proceeds through a given domain. Instead, a given polarization component of light will proceed at different rates through each domain to produce a phase shift there between. Under appropriate field conditions, the light will emerge from adjacent domains approximately 180° out of phase and be diffracted, irrespective of the polarization of the incident light.

In particular, if the plane of the cell is the x-y plane, and if in one domain or stripe nematic liquid crystals are oriented along the y-axis or vertically |, and in an adjacent domain or stripe the nematic liquid crystals are oriented along the x-axis or horizontally —, then the vertical component of light entering the first domain will see the extraordinary index of refraction ($n_e$), but will see the ordinary index of refraction ($n_o$) of the liquid crystal in the second domain. Likewise, the horizontal component will see $n_o$ in the first stripe and $n_e$ in the second. As a result, light will travel at different speeds through each domain, irrespective of polarization. Since $n_e$ is a function of voltage, light exiting adjacent domains will be diffracted when a voltage is applied (if necessary) such that the relation $\Delta nd/\lambda$ is a multiple of ½, wherein d is the thickness of the cell, $\Delta n$ is the difference between the ordinary and extraordinary indices of refraction and $\lambda$ is the wavelength of light. When the liquid crystal is perfectly homeotropically aligned $\Delta n$ is zero and no diffraction will occur.

There are numerous liquid crystal alignment configurations or combinations thereof suitable for producing the foregoing effect in accordance with the invention. First, as alluded to above, the liquid crystal molecules can be homogeneously aligned generally parallel to the substrates, but perpendicular to each other from one stripe or domain to the next. As used herein, homogeneous alignment refers to when substantially all of the liquid crystal molecules adjacent a substrate in the homogeneously aligned region lie generally parallel to one another, and substantially parallel to the substrate. This not only includes when the molecules lie exactly parallel to the substrate, but also when the molecules are slightly tilted with respect to the substrate such that they have a so called pretilt angle. Depending upon the manner of aligning the liquid crystal, the molecules may have a very slight pretilt angle inherently produced by the alignment procedure, or the method and materials may be selected to intentionally provide a desired pretilt angle.

To produce the noted orthogonal homogeneous alignment from domain to domain, a first of the substrates may be coated with, for example, polyimide and rubbed in one direction to provide homogeneous alignment of the liquid crystal in one direction. Through the use of masking techniques known to those of ordinary skill in the art, such as photolithography, alternating stripes may then be masked and the substrate again rubbed to provide homogeneous alignment of the liquid crystal in the unmasked stripes in the direction orthogonal to the first rubbing direction. The liquid crystal at the other substrate may be aligned in the same manner and the cell assembled such that the stripes of like liquid crystal orientation on opposite substrates are aligned. In this way, the liquid crystal between matching stripes on opposite substrates will retain the orientation of the liquid crystals at the substrate surfaces to produce uniform domains across the thickness of the cell. Preferably, the stripes of like orientation on opposite substrates have been rubbed coaxially but in opposite directions to compensate for any inherent pretilt that may be produced by the rubbing.

In a variant of this configuration alluded to above, the liquid crystals on one or both surfaces may, and frequently will, have an intentionally induced pretilt angle with respect to the cell surface to reduce the occurrence of so called anti-tilt disclinations. Importantly, any such pretilt angle must be such that the liquid crystal directors in a given domain all lie in substantially the same or parallel planes from one substrate to the other. This is conveniently accomplished by rubbing in opposite directions as noted above. However, this method has the drawback of requiring both surfaces to be patterned and carefully aligned with high precision. In addition, the voltages required for operation can be quite high.

In a second transmissive configuration that solves the problem of needing to pattern and align both substrates, each stripe forms a so called hybrid cell between the substrates. Here, one of the substrates is treated to promote homeotropic alignment of the liquid crystal molecules. As with the preceding configuration, the liquid crystal directors in a given domain all lie in substantially the same or parallel planes from one substrate to the other. This has the advantage of simplified manufacture and is conducive to the use of active matrices, such as thin film transistors (TFT's) or metal-insulator-metal (MIM) devices, in the cell design.

A variant on this configuration suitable for producing the desired effect involves the use of nematic liquid crystal having negative dielectric anisotropy. Here one substrate surface is treated to promote tilted homeotropic alignment of the liquid crystal. The liquid crystal molecules are tilted in adjacent domains or stripes such that, as with the foregoing configuration, the projection on the cell surface of the liquid crystal directors of the liquid crystal at the cell surface in adjacent domains are substantially orthogonal to each other. Thus, under sufficient field conditions, the orientation of the directors of the liquid crystal in a given stripe or domain are all substantially parallel from one substrate to the other, such that light entering adjacent domains will encounter different indices of refraction to fulfill the relation $\Delta nd/\lambda=1/2$ or some multiple thereof.

All of the foregoing configurations have the drawback of requiring higher value voltages that are not easily reached by active matrix TFT devices. It is highly desirable to achieve the polarization independent diffractive effect associated with the invention with the same voltages used by conventional active matrix TN devices. It has been found that this can be accomplished using a new concept in diffractive gratings that is based on the optical activity achievable with nematic liquid crystals. The application of optical activity to a diffractive device results in unexpectedly superior performance. The surprising feature of its operation is that in adjacent stripes there is no apparent difference in the optical path length, rather the device operates by rotating the polarization component of light in adjacent stripes to produce the desired 180° phase difference in light emerging from adjacent domains or stripes.

Here, a twisted nematic structure is established in adjacent domains to produce an effective phase shift of a given polarization component of light emerging from the cell, rather than the actual phase shift associated with the configurations heretofore mentioned. To this end, the liquid crystal in adjacent domains or stripes exhibits a twisted nematic structure extending from one substrate to the other wherein the twist direction or twist sense in adjacent domains is in opposite directions. As with the configurations described above, there is a 90° difference in the orientation of the projection on the cell surface of the liquid crystal directors midway between the substrates in adjacent domains. Thus, if the liquid crystal in one domain is twisted to rotate a polarization component of incident light 90° in one direction, and the liquid crystal in an adjacent domain is twisted to rotate that polarization component of incident light 90° in the opposite direction, light entering adjacent domains initially in phase will emerge from the other side π radians, or 180° out of phase. Again, this effect is observed regardless of the polarization of the incident light. Under field conditions effective to untwist the liquid crystal in the domains, the phase retardation for light passing through adjacent stripes is the same for a given polarization. Since the optical activity of the device is destroyed as soon as the liquid crystal director in the center of the cell is perpendicular to the substrates, only a relatively low voltage is necessary to switch between diffractive and non-diffractive states.

Suitable liquid crystal alignment configurations for producing a 180° phase difference in accordance with this aspect of the invention may be achieved by treating the surfaces of the cell to provide adjacent stripes with varying pretilt orientations effective to provide the desired twist sense. In particular, one of the substrates is treated to provide alternating domains or stripes wherein the orientation of the projection on the cell surface of the liquid crystal at the cell surface in adjacent stripes is approximately 180°. Although the liquid crystal in adjacent stripes on this substrate all lie in generally parallel planes, the liquid crystals are tilted in opposite directions, such that the tilt orientation in a plane orthogonal to the cell surface of liquid crystal molecules in adjacent stripes form mirror images of each other. The opposite substrate is treated to promote homogeneous alignment of the liquid crystal orthogonal to the liquid crystal on the first substrate. The liquid crystal molecules on this substrate preferably also have a pretilt angle, although it will generally be the case that any such pretilt will be of a uniform direction across the substrate. Generally, higher pretilts are preferred in order to stabilize the domain boundaries of opposite twist sense.

An opposite twist sense may also be obtained in adjacent domains using nematic liquid crystal having negative dielectric anisotropy. Here, both substrates are treated to promote a tilted homeotropic alignment, wherein the tilt direction and angle in adjacent stripes or domains on the substrate will be as described above, but the twisted nematic structure extending between substrates will occur in a field-on condition.

Alignment techniques readily adaptable to the instant application by those of ordinary skill in the art in view of the instant disclosure are disclosed in, for example, Hiroshima et al., *Proceedings of the SID*, Vol. 25(4), pp 287–92 (1984); Lackner et al., *SID 90 Digest*, pp 98–101 (1990); Koike et al., *SID 92 Digest*, pp798–801 (1992); Seki et al., *Mol. Cryst. Liq. Cryst.*, Vol. 199, pp. 151–58 (1991); S. Kobayashi et al., IDRC Digest, p. 78 (1994); *Liquid Crystals Applications and Uses*, Vol. 3, edited by Bahadur, World Scientific Pub. Co. (1992); Lien et al., *Proceedings of the 13th IDRC*, p 21 (1993); and Takatori et al., *Proceeding of the 12th IDRC*, p 91 (1992), all of which are incorporated herein by reference.

The present invention may also employ the above principles for use in reflective diffractive display devices. This aspect of the invention exhibits the excellent optical efficiencies as discussed above and provides further advantages over diffractive transmissive displays. Reflective displays are more efficient in that one of the two substrates is opaque or mirrored to allow more efficient use of the pixel area. In other words, since the patterned electrode and associated addressing hardware is hidden by the opaque or mirrored substrate, the entire area of the picture element may be utilized in contrast to transmissive displays. Further, edge diffraction, which lowers contrast and transmission, is eliminated.

It will be appreciated that implementation of the optically active diffractive technology utilized with transmissive displays is not readily applied to reflective displays. If the above disclosed diffractive devices are provided with one opaque or mirrored substrate, the light incident on the transparent substrate is simply reflected by the opaque substrate and exits the device with the same phase and is not diffracted efficiently for all polarizations. Another deficiency in employing liquid crystal material in adjacent domains having opposite rotational twist sense is that reverse twist disinclinations at the boundary between adjacent twist stripes are unstable at the full off state if low pretile angle alignment surfaces are used.

As such, the above devices must be modified to provide both diffractive and reflective properties. This is accomplished by employing virtually the same patterning technology as used with the transmissive diffractive devices except that the optical paths of the liquid crystal material are altered in at least one and in some instances both of the alignment domains.

The present invention is also directly applicable to fully implementing novel transmissive or reflective diffractive optical elements in liquid crystal structures by elimination of interdigitated electrode patterns and gaps which have limited prior performance in these kind of elements and wherein these elements can be used directly with un-polarized light for high efficiency. Structures not previously attempted can be accomplished by utilizing the present invention with standard lithography techniques or advanced holographic definition techniques. For example, in the present invention, liquid crystal materials can be placed in a small extrinsic gap or connection junction in the fiber path of an integrated fiber optic system and arranged in such a manner as to achieve a wide range of functions. The exact effect can be changed by the choice of the liquid crystal director alignments (orientation and patterning), the gap width, the orientation of the electrodes and the choice of the liquid crystal material. The liquid crystal materials can be arranged to directly form an optical diffraction grating or structure (lens) in the gap which can then be modulated by optical or electrical fields. Variable coupling factor optical attenuators, switches and multiplexers for ray integrated or fiber optics can be implemented with this invention.

Therefore, it is a first aspect of the present invention to provide a reflective optically active diffractive device.

It is another aspect of the present invention to provide a reflective optically active diffractive device for use in conjunction with a projection system.

It is still another aspect of the present invention to provide a reflective optically active diffractive device, as set forth above, which employs alternating alignment domains so that light incident upon one substrate is reflected by an opposite substrate and imparted with a phase shift that diffracts the incident light.

It is yet another aspect of the present invention to provide a reflective optically active diffractive device, as set forth above, wherein the alignment domains provide an opposite rotational twist sense and wherein one of the alignment domains imparts a different pre-tilt angle to the liquid crystal material received between the substrates than the adjacent domain, and wherein the different pre-tilt angle provides the necessary phase shift to the reflected light to impart diffractive properties thereto.

It is still yet another aspect of the present invention to provide a reflective optically active diffractive device, as set forth above, wherein both alignment domains provide the same rotational twist sense, and wherein the liquid crystal material in one domain is orthogonal to the liquid crystal material in the other domain at both substrates to provide the necessary phase shift to the reflected light to impart diffractive properties thereto.

It is a further aspect of the present invention to provide a reflective optically active diffractive device, as set forth above, wherein each alignment domain has an opposite rotational twist sense, and wherein the liquid crystal material in one domain is orthogonal to the liquid crystal material in the other domain at both substrates to provide the necessary phase shift to the reflected light to impart diffractive properties thereto.

It is still a further aspect of the present invention to provide electrically controllable, reflective and transmissive optically active diffractive devices wherein the alignment domains are generated using holographic or lithographic techniques in order to provide various geometric configurations that may be employed in the diffractive devices. In this regard, the patterning of the liquid crystal domains may be generated from phase diagrams of standard optical elements, interferograms or other holographic techniques to achieve various manifestations of diffractive optical devices for ray, integrated or fiber optic utilization such as, but not limited to, controllable diffraction gratings (including blazed functions), scanners, variable lenses, controllable holograms, structures, wavefront compensators, couplers, fiber optics elements, switches, attenuators, and the like. Further, patterning may be done in regular or irregular arrays of geometric figures such as: lines, circles, arcs, squares rectangular shapes and the like; mathematically generated patterns; or photographically, holographically or interferometrically generated structures.

The foregoing and other aspects of the invention, which shall become apparent as the detailed description proceeds, are achieved by a liquid crystalline diffractive light modulating device comprising nematic liquid crystal material disposed between first and second substrates defining cell walls and including means for addressing the liquid crystal material, the first substrate being treated to provide a plurality of domains in which the liquid crystal adjacent the first substrate in a first of the domains is projected in a different direction than the liquid crystal adjacent the first substrate in a second of the domains, the substrates cooperating with the liquid crystal to form a plurality of liquid crystal domains extending between the first and second substrates wherein the alignment of the liquid crystal adjacent the second substrate is different than the alignment of the liquid crystal adjacent the first substrate, whereby light incident on the first and second domains through one the substrate and in phase, is reflected or transmitted by the other of the substrates and exits the first and second domains through the one substrate out of phase, irrespective of the polarization of the incident light.

Other aspects of the invention are attained by a liquid crystalline diffractive light modulating device comprising nematic liquid crystal material disposed between first and second substrates defining cell walls and including means for addressing the liquid crystal material, the first substrate being treated to provide a plurality of first and second domains in which the liquid crystal material adjacent the first substrate in a first of the domains is projected in a different direction than the liquid crystal adjacent the first substrate in a second of the domains, the first domain having a first pretilt angle different than a second pretilt angle in the second domain, whereby light incident on the first and second domains through one the substrate and in phase, is reflected or transmitted by the other of the substrates and exits the first and second domains through the one substrate out of phase, irrespective of the polarization of the incident light.

Still other aspects of the invention are achieved by a liquid crystalline diffractive light modulating device comprising nematic liquid crystal material disposed between first and second substrates defining cell walls and including means for addressing the liquid crystal material, the first and second substrates being treated to provide a plurality of domains in which the projection of the directors in first domain are orthogonal to the projection directors in the second domain, wherein light incident on the first and second domains through the one substrate and in phase, is reflected or transmitted by the other of the substrates and exits the first and second domains with about a half wave relative phase shift, irrespective of the polarization of the incident light.

Yet other aspects of the invention are attained by a method of making a liquid crystalline diffractive device comprising: a) providing first and second substrates to define cell walls, and including means for addressing a liquid crystal material; b) treating the first substrate with a first alignment layer to provide at least first and second domains adapted to promote different orientations of a liquid crystal material in the domains; c) treating the second substrate with a second alignment layer adapted to promote an orientation of a liquid crystal adjacent the second substrate that is different than the orientation promoted by the first and second domains of the first substrate, and to cooperate with the first alignment layer and a liquid crystal disposed therebetween, to produce liquid crystal domains extending between the substrates; and, d) disposing a nematic liquid crystal material between the substrates to form liquid crystal domains extending between the substrates, whereby light incident on the first and second domains through the one substrate and in phase, is reflected by the other of the substrates and exits the first and second domains through the one substrate out of phase.

Further aspects of the invention are achieved by a method of making a liquid crystalline diffractive device comprising: a) providing first and second substrates to define cell walls, and including means for addressing a liquid crystal material; b) treating the first substrate with a first alignment layer to provide a plurality of domains in which a first the domain will promote an orientation of a liquid crystal material in the first domain orthogonally to a liquid crystal orientation promoted by the second domain; c) treating the second substrate with a second alignment layer adapted to cooperate with the first alignment layer and a liquid crystal disposed therebetween, to produce first and second twisted nematic liquid crystal domains having opposite twist sense extending between the substrates; and, d) disposing a nematic liquid crystal material between the substrates to form first and second liquid crystal domains extending between the substrates in which the projection of the directors on the substrate surface, of the liquid crystal in the first and second domains is substantially orthogonal, whereby light incident on the first and second domains through one of the substrates and in phase, is reflected by the other of the substrates and exits the first and second domains through the one substrate out of phase.

Still further aspects of the invention are attained by a method of making a liquid crystalline diffractive device comprising: a) providing first and second substrates to define cell walls, and including means for addressing a liquid crystal material; b) treating the first substrate with a first alignment layer to provide a plurality of domains in which a first the domain will promote a first pretilt orientation of the liquid crystal material and a second pretilt orientation of the liquid crystal material, different than the first pretilt orientation in the second domain; c) treating the second substrate with a second alignment layer adapted to cooperate with the first alignment layer and a liquid crystal disposed therebetween, to produce first and second twisted nematic liquid crystal domains having opposite twist sense extending between the substrates; and, d) disposing a nematic liquid crystal material between the substrates to form first and second liquid crystal domains extending between the substrates in which the projection of the directors on the substrate surface, of the liquid crystal in the first and second domains is substantially orthogonal, whereby light incident on the first and second domains through one of the substrates and in phase, is reflected by the other of the substrates and exits the first and second domains through one of the substrates out of phase.

Yet further aspects of the invention are achieved by a liquid crystalline diffractive light modulating device comprising nematic liquid crystal material disposed between first and second substrates defining cell walls, wherein at least one of the substrates is transparent and including means for addressing the liquid crystal material, the first substrate being treated to provide a plurality of domains in which the liquid crystal adjacent the first substrate in a first of the domains is projected in a different direction than the liquid crystal adjacent the first substrate in a second of the domains, the substrates cooperating with the liquid crystal to form a plurality of liquid crystal domains extending between the first and second substrates wherein the alignment of the liquid crystal adjacent the second substrate is different than the alignment of the liquid crystal adjacent the first substrate, whereby light incident on the first and second domains through one substrate and in phase, exits the first and second domains through one of the substrates out of phase, irrespective of the polarization of the incident light.

Still further aspects of the invention are achieved by a method of making a liquid crystalline diffractive device comprising: a) providing first and second substrates to define cell walls, wherein one of the first and second substrates is transparent and including means for addressing a liquid crystal material; b) treating the first substrate with a first alignment layer to provide at least first and second domains adapted to promote different orientations of a liquid crystal material in the domains; c) treating the second substrate with a second alignment layer adapted to promote an orientation of a liquid crystal adjacent the second substrate that is different than the orientation promoted by the first and second domains of the first substrate, and to cooperate with the first alignment layer and a liquid crystal disposed therebetween, to produce liquid crystal domains extending between the substrates; and, d) disposing a nematic liquid crystal material between the substrates to form liquid crystal domains extending between the substrates, whereby light incident on the first and second domains through one of the substrates and in phase, exits the first and second domains through one of the substrates out of phase.

All of the foregoing embodiments can be directly applied to creating transmissive or reflective diffractive optical elements in the cells described, by simply changing the patterning (and subsequently domain orientations) to those required for the phase front of the diffractive or binary optic to be implemented.

Still further aspects of the invention are attained by defining the cell boundaries or substrates by the faces, surfaces or extents of intrinsic or extrinsic gaps in optical elements such as, but not limited to optical fibers, integrated optical devices or bulk glass optical elements.

Many additional features, advantages and a fuller understanding of the invention will be had from the following detailed description of preferred embodiments and the accompanying drawings.

BRIEF DESCRIPTION OF THE DRAWINGS

FIG. 1 is a diagrammatic perspective representation of a portion of a pair of substrates constructed in accordance with the invention.

FIG. 2 is a diagrammatic perspective representation of the liquid crystal structure in a cell constructed in accordance with FIG. 1.

FIG. 3 is a diagrammatic plan representation of a variation of a cell configured in accordance with FIG. 1 wherein the liquid crystal molecules have a pretilt angle.

FIG. 4 is a diagrammatic plan representation of another variation of a cell configured in accordance with FIG. 1 wherein the liquid crystal molecules adjacent one substrate have a homeotropic alignment.

FIGS. 5a and 5b are diagrammatic plan representations of another pair of substrates constructed in accordance with the invention.

FIG. 6 is a simplified schematic of a test system employing a cell according to the invention.

FIG. 7 is a plot of the percent transmission of varying wavelengths of incident light versus applied voltage of a cell according to the invention in the system of FIG. 6.

DETAILED DESCRIPTION OF THE PREFERRED EMBODIMENTS

Transmissive Displays

Figure 8:
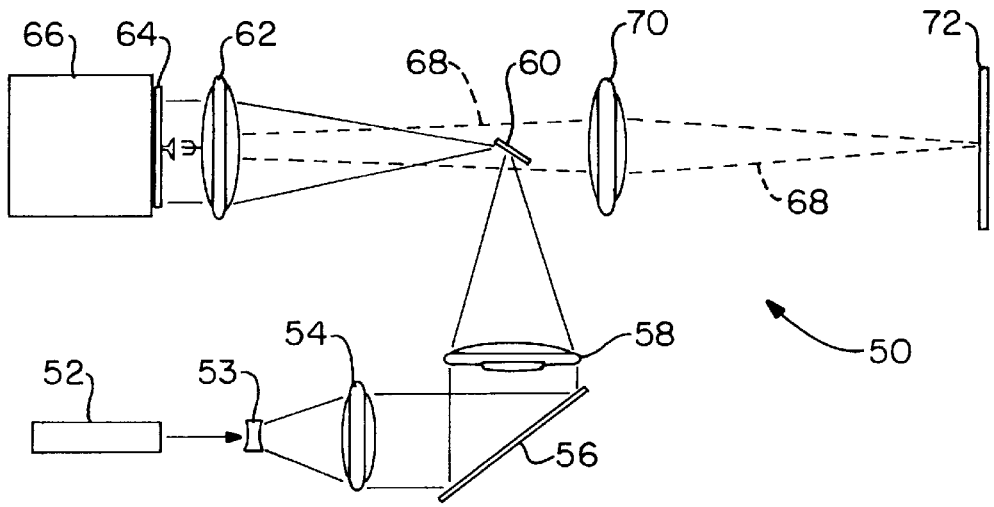
FIG. 8 is a simplified schematic of a reflective projection system employing a cell according to the present invention.

The preferred diffractive liquid crystal phase gratings according to the invention are shown in the drawings. Referring to FIG. 1, the liquid crystal cells for use as a transmissive diffractive light valve according to the invention include a pair of opposing substrates 2, 4 that are sealed around their edges and separated by spacers (not shown) to accommodate a liquid crystal material 16 therebetween as is known in the art. As shown, the cell 10 includes continuous transparent electrodes 6, 8 disposed on opposing substrates 2, 4, and alignment layers 12, 14 disposed on the electrodes. The alignment layers 12 and/or 14 are prepared so as to create a series of alternating stripes on one or both of the substrates 2, 4 to create alternating domains A, B within the cell in which the liquid crystal exhibits different orientations in adjacent domains. It is to be understood that although as shown, the domains are depicted as being rather large with respect to the substrate, in practice they are quite small. Preferably, each domain will be on the order of about 0.5 to 500 $\mu$m wide, and still more preferably about 20 to 75 $\mu$m wide. By coupling the electrodes or other addressing means overlying portions of one or more stripes, to suitable drive electronics, pixels can be selectively actuated to produce images in a diffractive light valve projection system. One advantage of the invention is that a plurality of generally continuous pixel sized transparent electrodes may be used, rather than high resolution patterned electrodes that must be processed to correspond precisely to each stripe.

Alignment layers 12, 14 are designed to provide for different liquid crystal orientations in adjacent domains or stripes such that the liquid crystal in one domain A will cause light passing therethrough to exit the cell $\pi$ radians, or 180°, out of phase with light exiting an adjacent domain B. In the practice of the invention there are essentially two principal liquid crystal properties that may be relied upon to accomplish this. The first is birefringence, in particular tunable birefringence, wherein the liquid crystal in adjacent domains A, B is oriented such that a given polarization component of light entering a domain A will encounter one of the ordinary ($n_o$) or extraordinary ($n_e$) indices of refraction, and that same polarization component entering an adjacent domain B will encounter the other of $n_o$ or $n_e$. Surprisingly, the second property that may be adapted to the claimed invention is optical activity, wherein adjacent domains exhibit twisted nematic liquid crystal structures having opposite twist senses, such that a given polarization component of light entering one domain A will be rotated in one direction, while the same polarization component of light entering an adjacent domain B will be rotated in the opposite direction. When the period of rotation is 90° across the thickness of the cell, light of a given polarization will emerge from the cell 180° out of phase regardless of polarization. In each case, under appropriate field conditions there will be an approximately 90° difference between the projection of the liquid crystal directors on the cell surface, of the liquid crystal in the center of the cell in adjacent domains A and B.

Suitable nematic liquid crystals include those having positive dielectric anisotropy as are commonly used in the industry, for example, E7, ZLI-4792, E48, E31, E80, TL202, TL203, TL204 and TL205 manufactured by EM Industries, and those having negative dielectric anisotropy also well known in the art, such as ZLI-4330, ZLI-2830 and ZLI-2806, also available from EM Industries. Other nematic liquid crystals and liquid crystal mixtures suitable for use in the invention would be known to those of ordinary skill in the art in view of the instant disclosure. In contrast to many twisted nematic devices, no chiral additive is necessary.

Although one advantage of the device according to the invention is that both substrates 2, 4 can include continuous electrodes 6, 8, at each pixel, it will be understood that the material can be addressed in various ways. For example, instead of being addressed by externally activated electrodes, the liquid crystal can be addressed by an active matrix, a multiplexing scheme or other type of circuitry, all of which will be evident to those working in the art.

A preferred cell design according to the invention is shown in FIGS. 1 and 2, wherein the liquid crystal 16 on each substrate surface is treated for homogeneous alignment substantially parallel to the substrate surfaces, but oriented orthogonally in adjacent domains. As seen in FIG. 1, the substrates 2, 4 include alignment layers 12, 14 that have each been patterned to form alternating stripes A, B in which the liquid crystal is oriented at right angles from stripe to stripe. The liquid crystal orientation at the surface of substrate 2 in stripe A corresponds to the liquid crystal orientation at the surface of substrate 4 in stripe A. Likewise, the orientation of the liquid crystal at opposing substrate surfaces in stripe B is the same. As shown in FIG. 2, this results in a liquid crystal structure extending from one substrate 2 to the other substrate 4 wherein the liquid crystals in a given domain are all oriented in the same or parallel planes across the thickness of the cell, to create liquid crystal domains A, B wherein the liquid crystal in one domain is orthogonal to the liquid crystal in an adjacent domain across the thickness of the cell.

With the domain orientation shown in FIGS. 1 and 2, light passing through the cell in adjacent domains will exit the cell from adjacent domains out of phase and be diffracted, regardless of the polarization of incident light. In particular, light incident on substrate 2 may be broken down into horizontal and vertical polarization components. The vertical polarization component passing into domain A will encounter the effective extraordinary index of refraction of the liquid crystal 16 in that domain, but will encounter the ordinary index of refraction of the liquid crystal 16 in domain B. Likewise, the horizontal component passing through domain A will encounter the ordinary index of refraction of the liquid crystal 16 in domain A, and the effective extraordinary index of refraction of the liquid crystal in domain B. Thus, when a voltage is applied to the device by electrodes 6, 8, such that the relation $\Delta nd/\lambda$ is a multiple of 1/2, wherein d is the thickness of the cell, $\Delta n$ is the difference between the effective extraordinary index of refraction and the ordinary index of refraction, and $\lambda$ is the wavelength of light, any polarization of light exiting adjacent domains A, B will be 180° out of phase and be diffracted. When the voltage is high enough to homeotropically align the liquid crystal molecules 16, or more generally when $\Delta nd/\lambda$ is zero or an integer, light will not see any difference in the index of refraction between adjacent domains and will pass through the cell undiffracted.

Thus, it will be appreciated by those skilled in the art that a twisted structure as presented herein reduces the operation voltage, with a 90° twist providing the optimum results. It has been found that transmissive devices employing stripes or domains with opposite rotational twist sense and parallel or anti-parallel alignment in adjacent domains performs optimumly when $\Delta nd/\lambda$ is equal to about 0.87.

Surface treatments suitable to produce the striped alignment shown in FIG. 1 would be apparent to those of ordinary skill in the art in view of this disclosure. Those skilled in the state of the art will appreciate that the alternating domains may be provided in parallel stripes, concentric rings, rectangular arrays of either high aspect ratio rectangles such as squares or low aspect ratio rectangles such as finite width lines, or any other geometric shape or mathematically definable contour. Further, patterning may be done in regular or irregular arrays of geometric figures such as: lines, circles, arcs, squares rectangular shapes, and the like; mathematically generated patterns; or photographically, holographically or interferometrically generated structures. In one such embodiment, the substrates are coated with polyimide or analogous material and mechanically rubbed to provide the desired alignment as is known in the art. For example, a clean indium tin oxide (ITO) coated glass substrate is spin coated with polyimide (PI) material, such as is commercially available from Nissan under the designation PI7311, to a thickness of about 550Å. The substrate is then soft baked at, for example, 100° C. for about a minute to remove solvent, and then hard baked at, for example, 275° C. for about 2hours to cure the polyimide. Next, each of the coated substrates is first rubbed in one direction to provide homogeneous alignment of the liquid crystal in one direction. Once the substrates have been uniformly rubbed, the alternating domains are created through the use of photolithography. Those regions or stripes that are desired to retain the orientation produced by the first rub are masked with a photoresist material as is known in the art, for example as is commercially available from Shipley under the designation S1400-31, which has been patterned to create the desired stripe pattern across the substrate surface. Kits for providing patterned rubbed alignment and suitable for use in the invention are also known in the art and commercially available, such as from JSR Microelectronics Inc., using the photoresist JALS-381 and alignment material AL3046.Thereafter, the substrates are rubbed perpendicular to the first rub, and the photoresist removed. In this way, alternating domains are created in which the liquid crystals are oriented orthogonally to each other in adjacent domains. When stripes of like orientation on opposite substrates are aligned with one another as shown in FIG. 1, a positive nematic liquid crystal will assume the generally parallel orientation from one substrate to the other shown in FIG. 2.

It will be understood that mechanical rubbing of various polyimides and analogous materials may produce a slight pretilt depending upon the material. In fact, as discussed below, such pretilts are frequently desirable. When the rubbing produces a pretilt, either inherently or by design, it is desirable to rub the opposite substrate in the opposite direction so as to reduce the propensity of the liquid crystal to splay or twist as it progresses across the cell, thereby eliminating so called reverse tilt disclinations. Thus, for example, the rub direction used to create stripe A on substrate 2 in FIG. 1 would be upward toward the top of the page, and the rub used to create stripe A on substrate 4 would be downward toward the bottom of the page.

Thus, in a preferred variant, the liquid crystal in stripes A, B of FIG. 1 is not homogeneously aligned exactly parallel to the substrates 2, 4, but instead may have a so called pretilt angle with respect thereto. A pretilt angle has the advantage of reducing the tendency of the liquid crystal to form antitilt disclinations. Preferably, the molecules will have a pretilt angle with respect to the substrate of from about 0.5° to about 30°, with angles of from about 6° to about 8° being typical, and angles of at least about 8° to 10° being preferred. Importantly, as seen in FIG. 3, the molecules on a given substrate, in a given domain, all tilt in the same direction with respect to the substrate, which is opposite the tilt direction of the liquid crystal in the corresponding stripe on the opposing substrate. Advantageously, this orientation will result from the antiparallel rubbing described above. In this way, the liquid crystal directors all lie in substantially the same or parallel planes across the thickness of the cell in a given domain when no field is applied.

Two key factors in selecting a suitable polyimide material are pretilt angle and compatibility to the photolithography process. In fact, polyimide materials specifically designed to provide particular pretilt angles when used with specified liquid crystals are now widely commercially available. Suitable polyimides would be known to those of ordinary skill in the art in view of this disclosure, and are commercially available from, for example, Nissan under the tradename Nissan PI7311, or Dupont under the designation Dupont 2555. The manner of deposition, baking, rubbing and the like of these and other materials are known to those of ordinary skill in the art. A preferred material is Nissan PI7311 polyimide, which produces a pretilt angle of about 8° using the liquid crystal E7. For a more detailed discussion of the type of polyimide to use for a particular liquid crystal pretilt angle and the effect of rubbing on the orientation of liquid crystals adjacent the cell wall substrates, see S. Kobayashi et al., *New Development in Alignment Layers for Active Matrix TN-LCD's*, IDRC Digest, p. 78(1994), which is incorporated herein by reference.

Notably, in the preferred manner of preparing a cell according to the invention, it is desirable to cure the polyimide with a hard baking temperature in excess of the curing temperature prescribed by the manufacturer. It has been found that higher hard baking temperatures tend to yield less defects after the second rub. Thus, when selecting a suitable polyimide, it is also desirable to choose those having a relatively low curing temperature.

Pretilt angles may also be obtained by various methods of oblique deposition of silicon oxides ($SiO_x$), wherein x is an integer from 1 to 3, as would be apparent to those of ordinary skill in the art in view of the instant disclosure. In particular, the various masking steps and desired liquid crystal orientations are the same as with the preparation of a cell using rubbed polyimide, except that the deposition and rubbing steps are replaced by oblique evaporation of an $SiO_x$ layer. Suitable evaporation angles will range from about 4 to about 10° with respect to the substrate, and preferably about 5°. After the first evaporation process, the photolithography mask is applied and the substrate rotated so that the second evaporation process produces the desired orthogonal orientation from domain to domain.

For a discussion of other vacuum oblique evaporation techniques adaptable for use in the invention, see K. Hiroshima and H. Obi, SID Digest, p. 287 (1984); K. Hiroshima, Jpn. J. Appl. Phys. 21, L761 (1982) and Janning, *Appl. Phys. Lett.*, 21 p173(1972), incorporated herein by reference.

Another configuration of a tunable birefringence type device adaptable for use in the in accordance with the invention is a hybrid cell as seen in FIG. 4. In this embodiment, one substrate is treated to provide the striped homogeneous arrangement shown on the substrate 2 in FIG. 1, and the other substrate is treated to promote homeotropic alignment. Homeotropic alignment is easily obtained by coating the substrate with, for example, silanes or surfactants, as is known in the art. One such suitable material is Nissan RN722. Treating one substrate for homeotropic alignment advantageously eliminates the need to rub both substrates and to thereafter align them. As a result, the substrate treated for homeotropic alignment, which does not require rubbing, is especially conducive to the use of an active matrix, such as a thin film transistor arrangement. As seen in FIG. 4, the liquid crystal molecules adjacent substrate 2 are homogeneously aligned, preferably with a pretilt, with the molecules in domain A oriented substantially perpendicular to the molecules in domain B. At the opposite substrate 4, the liquid crystal molecules are all generally homeotropically aligned. As the liquid crystal molecules progress across the cell from substrate 2 to substrate 4, they gradually tilt toward a homeotropic alignment with the molecules in a given domain all oriented in substantially the same or parallel planes across the thickness of the cell. As with the cell depicted in FIG. 1, horizontally polarized light entering substrate 2 will see $n_o$ in domain A, while vertically polarized light will encounter $n_e$, and vise versa in domain B. Since light of an arbitrary polarization may be decomposed into vertical and horizontal polarization components, under appropriate field conditions $(n_e - n_o)(d)/\lambda$, will be n/2 where n is an odd integer and maximum diffraction of light will result. If n/2 is equal to an integer or zero, then light will not be diffracted.

In another embodiment, a nematic liquid crystal having negative dielectric anisotropy may be used. In this embodiment, both surfaces are treated to promote a tilted homeotropic alignment, with the direction of the tilt in one domain being orthogonal to the direction of the tilt in an adjacent domain. In this way, the projection of the liquid crystal directors on the cell surfaces in adjacent domains are orthogonal to each other, and under appropriate field conditions, there is an approximately 90° difference in the projection on the cell surface of the directors of the liquid crystals midway between substrates in adjacent domains. Conceptually, the orientation of the liquid crystal on opposite substrates and in adjacent domains is analogous to the configuration shown in FIG. 3, except that the liquid crystals are slightly tilted with respect to the cell normal, rather than the substrate surfaces as depicted. Suitable surface treatments for obtaining a tilted homeotropic alignment at the cell surfaces are known to those of ordinary skill in the art.

Methods of oblique evaporation of silicon oxides ($SiO_x$) are especially preferred. As with the preceding embodiments, the striped array or domain configuration is obtained through the use of masking techniques such as photolithography. In particular, the method includes the steps of depositing a thin layer (300–550 Angstroms) of silicon monoxide SiO onto a rotating substrate by vacuum oblique evaporation. The surface topography of the layer is isotropic due to the symmetry of the deposition. The rotation of the substrate is stopped opposite to the desired pretilt direction and a second evaporation is given for a short period of time. This adds a small anisotropy to the surface topography and the liquid crystal molecules will tilt in that direction. By changing the thickness of the second layer it is possible to vary the pretilt angle from 0 to about 15°. It is also possible to obtain similar results by interchanging these two steps, i.e., first evaporating on a fixed substrate, then evaporating on a rotating substrate.

After the second evaporation the substrate is masked in an alternating striped pattern. The substrate is then rotated 90° and a third layer of evaporated material is deposited for a short period of time. This provides liquid crystal molecules adjacent the surface with tilted homeotropic alignment with the liquid crystals being tilted orthogonally in adjacent stripes. The second wall structure is treated in the same manner and the substrates aligned.

An especially preferred device according to the invention relies on the optical activity of the nematic liquid crystals to create alternating stripes or domains in which the liquid crystal in adjacent domains will rotate a given polarization of light in opposite directions to produce a phase difference in the light emerging from adjacent domains. As seen in FIGS. 5a and 5b, by treating the substrate surfaces 2, 4 to provide a desired orientation and pretilt of the liquid crystal in adjacent domains A, B, the liquid crystal will form a twisted nematic liquid crystal structure extending between the substrates. Depending upon the orientation and tilt direction of the liquid crystal in adjacent domains at the cell surfaces, the liquid crystal in adjacent domains will twist in opposite directions across the cell. When the liquid crystal in adjacent domains in the center of the cell is oriented at approximately right angles from domain to domain, light in adjacent domains will be rotated 90° in opposite directions to emerge from adjacent domains π radians out of phase.

As with the birefringence embodiments, this cell will diffract light irrespective of the polarization of the incident light. The horizontal polarization component of incident light that is initially in phase entering adjacent stripes A, B will be rotated 90° in opposite directions and emerge from the cell out of phase. Likewise, the vertical polarization component of incident light that is initially in phase will also emerge 180°out of phase. When a field is applied sufficient to homeotropically align the liquid crystal, the optical activity of the device is destroyed and light will pass through the cell unaffected and will not be diffracted. Advantageously, the field need only be sufficient to align the liquid crystal in the center of the cell perpendicular to the substrates to destroy the optical activity of the device. As a result, only relatively low driving voltages are necessary for the efficient operation of the cell. Notably, the value of the birefringence of the medium does not matter under appropriate field conditions as long as the condition for optical activity is satisfied. This condition is quantified by the well known Gooch & Terry equation, *Electronics Letters*, Vol. 10, pp2–4 (1974). This equation is satisfied for optical activity where $1/2\sqrt{(1+(2\Delta nd/\lambda)^2)}$ is equal to an integer. Ideally, it is desirable for the cell to meet the conditions where this equation is equal to 1, which is the first interference minima.

A significant advantage of this configuration is that it only requires multiple rubs and masking on one substrate. The opposite substrate may be treated to provide a homogeneous alignment with a suitable pretilt angle in one direction across the entire substrate. This may be accomplished by rubbing a suitably selected polyimide designed to provide a desired pretilt. Alternatively, the substrate may be treated with oblique evaporation of silicon oxides as discussed above. This is especially desirable when a thin film transistor arrangement is desired for one of the substrates.

It is preferable that the liquid crystal at the surfaces of the substrates have a relatively high pretilt angle to overcome any propensity of the liquid crystal to twist in the wrong direction due to the competing forces at the domain boundaries. Thus, it is preferable that the liquid crystal tilt with respect to the substrates at an angle of from about 10° to about 25°. To this end, oblique evaporation of silicon oxides tends to provide the best results. As seen in FIGS. 5*a* and 5*b*, the liquid crystal in adjacent domains on substrate 4 is all uniformly aligned and tilted in the same direction, as shown coming out of the paper. To obtain the desired reverse twist sense in adjacent domains, the opposite substrate 2 is treated to provide a liquid crystal orientation in which the liquid crystal pretilt orientation in one domain A is a mirror image of the liquid crystal orientation of the liquid crystal in the adjacent domain B. This is accomplished by treating the surface of substrate 2 to provide a uniform homogeneous liquid crystal orientation with the desired pretilt in one direction, then masking the substrate in the desired striped pattern through photolithography and rubbing or treating the surface to promote the homogeneous tilted alignment of the unmasked liquid crystal in the opposite direction. Thereafter, the photoresist is removed such that when the cell is filled with nematic liquid crystal having positive dielectric anisotropy, the liquid crystal will form a twisted nematic structure in adjacent domains A, B in which the liquid crystal has opposite twist sense.

By incorporating a device prepared in accordance with the foregoing into a projection system, excellent transmission efficiency may be obtained to provide bright, economical large size displays. A simplified system is depicted in FIG. 6. As shown, the liquid crystalline diffractive light valve 10 according to the invention is disposed between a focused light source 20 and a spatial filter, shown as louvers 22. Various regions of the light valve 10 are activated by drive electronics to switch the device between diffracting and non-diffracting modes. When in the diffracting mode, light from light source 20 will pass through device 10 and be diffracted into a diffraction pattern, with as much light as possible being diffracted into the odd orders. The zero and other unwanted orders are blocked by louver 22 as indicated by the dashed lines in FIG. 6, and the even orders pass through the louvers and are focused by lens 24 onto the viewing surface 26. The diffraction efficiency of the device 10 according to the invention is capable of approaching 100%. As a result, the transmission efficiency from light source 20 onto viewing surface 26 also approaches 100%.

Figure 16:
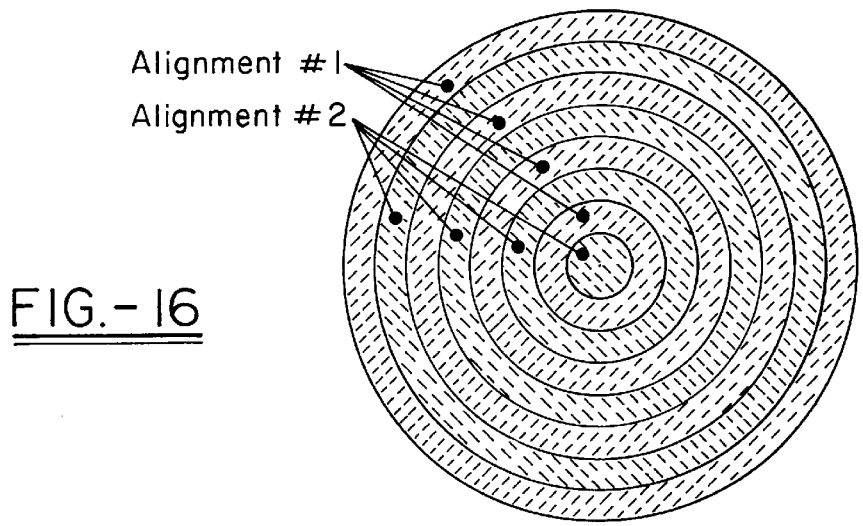
FIG. 16 is a schematic diagram of patterns arranged in concentric circles of varying width which could be used to implement a variable focal length, diffractive optic lens.

All of the foregoing embodiments can be directly applied to creating transmissive diffractive optical elements in the cells described, by simply changing the patterning (and subsequently domain orientations) to those required for the phase front of the diffractive or binary optic to be implemented. A schematic of such an optic is shown in FIG. 16. In this embodiment, adjacent concentric circles would be patterned using any of the foregoing embodiments to achieve a 180° phase difference between light exiting adjacent circles. The width of adjacent circles would then vary in accordance with the phase profile of the lens design to be accommodated. The phase profile of the lens design is generated from standard practices by those familiar with the art of diffractive lens design in evaporated or bulk glass materials.

These and other features of the invention will be apparent from the following non-limiting examples.

EXAMPLE 1

A optically active cell was prepared using a polyimide alignment material available from Nissan under the tradename Nissan PI7311. The polyimide material was spin coated onto an ITO coated glass substrate (Donnoly Corp.) at 3500 rpm for 30seconds to a thickness of 550Å. The substrate was then soft baked at 100° C. for one minute to get rid of solvent, followed by hard baking at 275° C. for 2 hours to cure the polyimide. Next the polyimide coated substrate was rubbed in one direction at a speed of 3.5 ft/min. to provide a unidirectional homogeneous alignment. A photo-resist (Shipley S1400-31) was spin coated onto the substrate to a thickness of about 1.8 $\mu$m and baked at 100° C. for 1 minute, and a striped U.V. mask was used to form stripes approximately 75 $\mu$m wide, and spaced apart approximately 75 microns, and the photoresist cured by UV exposure from a NuArc 26-1 K providing 3 mW/cm$^2$ for about 1 minute. The uncured photoresist was removed with developer (Shipley MF312CD27), and the substrate washed and dried to create a mask to the second rubbing step.

The masked substrate was then rubbed again in the opposite direction, followed by removal of the photo-resist mask with acetone and water. The opposite ITO coated glass substrate was coated with a polyimide commercially available from Dupont under the tradename Dupont 2555, and rubbed uniformly in one direction. The substrates were then assembled such that the rubbing direction of the second substrate was orthogonal to the rubbing directions on the first substrate, separated by 6 micron spacers and vacuum filled with nematic liquid crystal E7.

The cell was tested using the optical system shown in FIG. 6, wherein light source 20 is a laser, and the viewing surface 26 is a photodetector. The cell was illuminated with laser sources having wavelengths of 523 and 630 nm, respectively, to provide light with an angular spread of about 2° at the incident surface of the cell. In application, it is desirable for a light valve projector that nearly all of the light be diffracted into the odd orders when in the diffracting state, and that none of it is diffracted when in the non-diffracting state. Here, the louvers collected light from the first 7 orders. It is estimated that 2 to 3% of the light is diffracted into orders beyond 7 that are blocked. FIG. 7 shows the light diffracted by the test cell into the odd orders as a function of voltage, showing grey scale operation of the device. The peak transmission for green light (523 nm indicated by the diamonds) is 94% of the total amount of light transmitted by the cell, and the contrast ratio is 44 if the dark state voltage is taken to be 7 volts and the background is subtracted. For red light (630 mn indicated by the squares) the peak transmission is 88% and the contrast ratio is 372. The lower transmission for red light is due to the cell being slightly too thin to achieve the Gooch & Terry first interference minimum for 630 nm. The lower contrast ratio for green light is due to the louvers not being well matched to the green light diffraction pattern. Nevertheless, the cell demonstrated the ability to obtain exceptional diffraction efficiency and, hence, modulation efficiency in accordance with the invention.

EXAMPLE 2

A second cell was prepared as described in the preceding example, except that the stripes were 25 μm wide and spaced 25 μm apart, creating 25 μm domains, and the polyimide material on the second substrate was Nissan NI7311. This cell was tested in a Schlieren projection system, wherein the light source was a virtual point source formed by imaging the output of a fiber optic source with a relay lens. The optical fiber was fed by a 630 nm red laser. A Schlieren lens imaged the point source onto a single Schlieren output bar blocking the zero order diffraction spot. A projection lens focused the unblocked output of the cell onto a screen from which the measurements were directly taken. This cell had a transmissive optical efficiency of 94% with a contrast ratio of 981:1.

EXAMPLE 3

An optically active light valve may be prepared in accordance with Example 1wherein the rubbed polyimide alignment layers were replaced with oblique evaporated SiO as follows. The first substrate is subjected to oblique evaporation of SiO at an angle of 85° from the plate normal at a rate of about 10Å per minute. During the evaporation the vacuum evaporation chamber is maintained at a pressure of $10_{-6}$ Torr. The thickness of the first SiO deposition is thus about 150Å. The substrate is then masked by photolithography as described in Example 1, with the stripe direction running in the direction of the plane containing the substrate normal and evaporation direction. The substrate is then rotated 180° about its normal, and a second oblique evaporation of SiO is applied in the same manner as the first. The photoresist mask is then removed, thereby exposing alternating domain stripes in which the liquid crystal will be tilted in opposite directions in adjacent domains. The opposite substrate is subjected to a single oblique evaporation under the same conditions as the first evaporation on the first substrate, and the cell assembled with the evaporation directions on opposing substrates orthogonal, and filled with liquid crystal as described.

EXAMPLE 4

A tunable birefringence device may be prepared in accordance with the invention using the rubbing and masking technique described in Example 1. Here both substrates are prepared in the manner described for the first substrate in Example 1 except that the first and second rubs were orthogonal to each other rather than 180°. Once prepared, the opposite substrates are assembled such that the stripes of coaxial rubbing orientations are aligned one above the other on opposing substrates. Thereafter, the cell is vacuum filled with liquid crystal as described.

EXAMPLE 5

A hybrid type tunable birefringence device according to the invention may be prepared by preparing the first substrate by rubbing as described in Example 1, or by oblique evaporation as described in Example 3, except that the first and second rubs or evaporations are orthogonal to each other rather than 180°. The second substrate is then prepared by spin coating a surfactant to promote homeotropic alignment. Thereafter, the cell is assembled in the normal fashion and filled with nematic liquid crystal.

Reflective Displays

In a manner similar to the transmissive displays described above, reflective optically active diffractive devices modify the optical path of light incident upon the liquid crystal cell. Whereas in the transmissive displays both substrates of the liquid crystal cell are transparent, one of the substrates in reflective liquid crystal displays is opaque or mirrored. By employing adjacent alignment domains that at least provide different optical paths, that is, paths that reflect light in different phases, the liquid crystal cell can reflect and diffract light incident thereto. This is true in display embodiments or diffractive optic embodiments.

One example of how such a reflective optically active diffractive device operates is presented in FIG. 8 where a reflective optical system is designated generally by the numeral 50. The system 50 includes a light source 52 which may be a diode laser, a metal halide arc or a xenon arc that produces lumen output sufficient for operating a large screen television or theater display. The light source 52 generates light that is imparted on a lens 53 which expands the light beam that is received by a lens 54 for reflection by a mirror 56. A beam forming lens 58 receives the light reflected by the mirror 56 and re-focuses this light to a beam for reflection by a projection mirror 60 which re-projects the light onto a Schlieren lens 62. Juxtaposed on the opposite side of the Schlieren lens 62 is a liquid crystal display 64. An addressing system 66 is coupled to the display 64 in a manner well known in the art. In the preferred embodiment, the system 66 operates on low voltage such as provided by MOSFET, or thin film transistor (TFT) technology. The system 66 may also be driven by acoustic, photo-sensitive, metal-insulator-metal (MIM) or other drive topologies known in the art. The addressing system 66 generates the desired image for projection by the system 50. Accordingly, the liquid crystal display 64, which employs the reflective diffractive technology described hereinbelow, provides an image which is projected through the lens 62 and diffracted around the mirror 60 as evidenced by diffracted light waves 68 and received by a projection lens 70. As such, the image generated by the liquid crystal display 64 is re-focused by the projection lens 70 onto an image screen 72.

Although not readily apparent from the discussion of the transmissive displays, the disclosed optically active diffractive device is applicable, with modifications, to reflective displays. It would be presumed that by simply substituting an opaque or mirrored substrate for one of the transparent substrates to obtain a reflective diffractive display would not be feasible. The reason is that the optical activity, or rotation of the polarization ellipse that was caused by the first traversal of the liquid crystal layer is reversed upon reflection. In other words, the polarization state of light entering the liquid crystal cell is unchanged in reflection. Therefore, none of the diffractive properties realized in the transmissive displays are provided by simply substituting a reflective substrate for a transparent substrate.

In the transmissive displays it was found that by rotating the incident light or imparting a phase shift of exactly $\pi$ radians or 180° produces, theoretically, a 100% diffraction efficiency. By employing opposite rotational twists in adjacent domains, such a liquid crystal device is equally effective upon vertically polarized light (extraordinary wave) as it is upon horizontally polarized light (ordinary wave). It has been found that by reducing the amount of phase shift imparted by the liquid crystal cell, a reflective optically active diffractive device can be produced using several different cell constructions. One embodiment, provides the requisite phase shift by employing opposite rotational twist senses in adjacent domains, wherein each domain employs a different pre-tilt angle on at least one of the substrates. Another embodiment employs the same rotational twist sense in each domain, but each domain orients the liquid crystal material perpendicularly to each other at both substrates. Still another embodiment employs opposite rotational twist sense in each domain and orients the liquid crystal material perpendicularly to each other at both substrates. All of these embodiments will now be discussed in turn.

Figures 9, 10, 11:
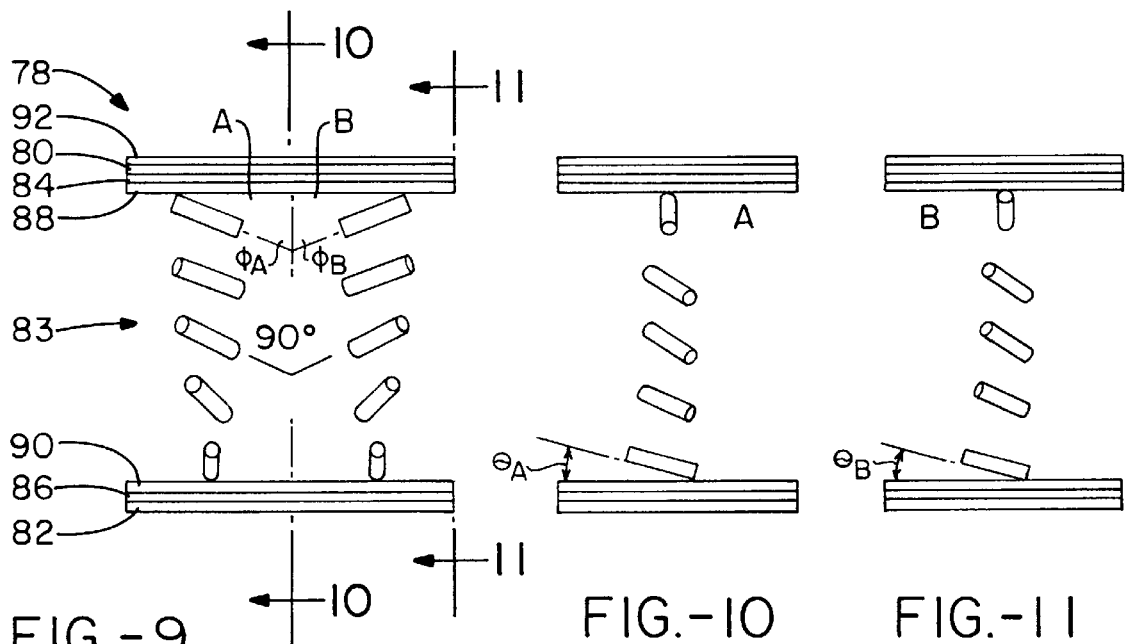
FIG. 9 is a diagrammatic plan representation of a pair of substrates constructed in accordance with the present invention.
FIG. 10 is a side view of one domain taken along line 10—10 of FIG. 9.
FIG. 11 is a side view of an adjacent domain taken along line 11—11 of FIG. 9.

Referring now to FIGS. 9–11, it can be seen that a portion of a pixel or picture element provided by a liquid crystal display cell is generally designated by the numeral 78. The cell 78 includes a pair of opposing substrates 80, 82 that are sealed around their edges and separated by spacers (not shown) to accommodate a liquid crystal material 79 therebetween as is known in the art. As shown, the cell 78 includes continuous transparent electrodes 84, 86 disposed on respective opposing substrates 80, 82, and alignment layers 88, 90 disposed on respective electrodes. The alignment layers 88 and/or 90 are prepared so as to create a series of alternating stripes on one or both of the substrates 80, 82 to create alternating domains A, B within the cell in which the liquid crystal exhibits different orientations in adjacent domains. An opaque or mirrored surface 92 is provided adjacent the substrate 80. As such, the cell 78 would be positioned such that incident light would be projected through substrate 82 and reflected by substrate 80.

It is to be understood that although as shown, the domains are depicted as being rather large with respect to the substrate, in practice they are quite small. Preferably, each domain will be on the order of about 0.5 to 500 $\mu$m wide, and still more preferably about 20 to 75 $\mu$m wide. By coupling the electrodes or other addressing means overlying portions of two or more stripes, to suitable drive electronics, pixels can be selectively actuated to produce images in a reflective diffractive light valve projection system. Of course, the pixels may also be actuated to a non-diffracting state. One advantage of the invention is that a plurality of generally continuous pixel sized transparent electrodes may be used, rather than high resolution patterned electrodes that must be processed to correspond precisely to each stripe. Those skilled in the art will appreciate that the alternating domains may be provided in parallel stripes, concentric rings, rectangular arrays of either high aspect ratio rectangles such as squares or low aspect ratio rectangles such as finite width lines, or any other appropriate geometric shape or mathematically definable contour. Again as with transmissive embodiments, pattering for reflective devices may be done in regular or irregular arrays of geometric figures such as: lines, circles, arcs, squares rectangular shapes and the like; mathematically generated patterns; or photographically, holographically or interferometrically generated structures.

As seen in FIG. 9, domains A and B are provided with respective opposite twist rotations to rotate a given polarization of light in opposite directions to produce optical activity in both domains. Each domain A and B is provided with its own distinct pretilt angle at at least one of the substrate surfaces. As seen in FIG. 9, the liquid crystal material in domain A may be provided with a pre-tilt angle $\Phi_A$ with respect to substrate 80 which is distinctly different than the pre-tilt angle $\Phi_B$ provided in domain B. The angles $\Phi_A$ and $\Phi_B$ may be in the range of $4° \leq \Phi \leq 30°$. In a similar manner, FIGS. 10 and 11 illustrate that domain A may be provided with a pre-tilt angle $\Theta_A$ with respect to substrate 82 that is distinctly different than the pre-tilt angle $\Theta_B$ provided in domain B with respect to substrate 82. The angles $\Theta_A$ and $\Theta_B$ maybe in the range of $4° \leq \Theta \leq +°$.

With pre-tilt angles provided with respect to at least one of the substrates, that is where the pre-tilt angles are different with respect to a substrate in each adjacent stripe, a reflective diffractive optical path is created. For the extraordinary index of refraction wave or e-wave incident upon the transparent substrate 82, the total phase angle for the domains A and B, upon reflection, can be made a 1/2 wave. This is apparent if the cell 78 is thick enough to be considered a pure optical rotator. Although it would be expected that the ordinary index of refraction wave or o-wave would not be expected to be refracted, it has been found that diffraction efficiencies of about 50% for unpolarized light can be obtained by providing a comparatively thin cell that would not be considered for use as a pure optical rotator. By using a thin enough cell, it has been found that mode mixing occurs and the total phase of any polarization state for even stripes of one domain is different for odd stripes of another domain.

It will be appreciated that in this embodiment, the different pre-tilt angles in the adjacent domains creates a different length optical path pattern that functions to diffract the light reflected by the substrate 80. By adjusting each pre-tilt angle, appropriate diffractive properties can be generated.

Figure 12:
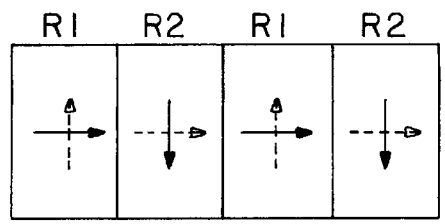
FIGS. 12, 13 and 14 are schematic diagrams showing the orientation of the liquid crystal material in adjacent domains.
Figure 14:
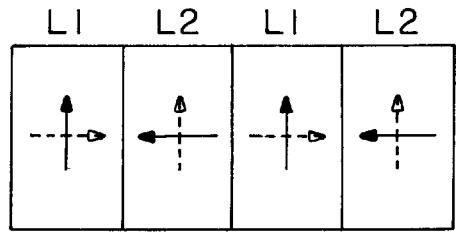

Referring now to FIGS. 12 and 14, it can be seen that alternating adjacent domains A and B can be generated, wherein each domain contains a twisted nematic (TN) liquid crystal cell that have the same directional rotation or twist sense. The orientations of the liquid crystal material in the adjacent regions are perpendicular or orthogonal to one another at both substrates. For each substrate, one photolithography step is needed to pattern alignment directions in adjacent stripes or domains. This kind of alignment pattern may be obtained by processes known in the art such as a double rubbing process, a double SiOx oblique evaporation, a double linearly polarized UV exposure process, or by holography to name a few. FIG. 12 presents an embodiment where both domains are provided with a right hand rotation and FIG. 14 presents an embodiment where both domains are provided with a left hand rotation. Either of these embodiments may employ suitable chiral doped liquid crystal material. If negative dielectric anisotropy liquid crystal material is used, tilted homeotropic alignment layers can be used to realize different diffraction structures.

Figure 13:
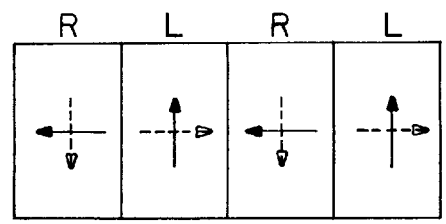

In FIG. 13 it can be seen that the cell may be provided with much the same structure as set forth in the cells of FIGS. 12 and 14, but with the notable exception that the alternating domains are provided with opposite twist rotations. As such, the structure of this cell is akin to that of the transmissive displays presented above except that the orientations of the liquid crystal material are separated by 90° instead of 180°.

The cells presented in FIGS. 12–14 impart optical phase shifting to incident light in the following manner. As discussed previously, incident light is decomposed into two components. One component is parallel to the domains or stripe lines and the other component is perpendicular to the domains or stripe lines. Since a normal TN cell is an optical rotator, each light component is exposed to the opposite refractive index, $n_o$, $n_e$. in the adjacent domains. For adjacent domains having the same twist direction (FIGS. 12 and 14), the phase difference $\Delta\delta$ after the light passes through the liquid crystal cell is equal to $2 \mu d(n_e-n_o)/\lambda$. For adjacent domains having opposite twist direction (FIG. 13) the phase difference $\Delta\delta$ is equal to $2 \mu d(n_e-n_o)/\lambda + \mu$. If $\Delta\delta$ is equal to $(2n+1)\mu$ then 100% diffraction efficiency is obtained. If $\Delta\delta$ is equal to $2\mu$, then no diffraction of the incident light is realized. The embodiment illustrated in FIGS. 12–14 has no polarization dependence. It will also be appreciated that the twist configurations in the domains is destroyed when a relatively low voltage of about 5 volts is applied to the liquid crystal cell. When this occurs, the incident light encounters two thin perpendicular birefringence layers at each domain and no diffraction takes place.

In reflective displays where stripes or domains have opposite twist sense and parallel or anti-parallel alignment in adjacent domains a diffraction efficiency of close to zero is obtained where $\Delta n d/\lambda$ is equal to about 0.87. However, it has been found that diffraction efficiencies of about 72% can be realized with the same structure where $\Delta n d/\lambda$ is equal to about 0.43. This structure can also yield similar diffraction efficiencies if the pre-tilt angles in the adjacent domains are different.

Figure 15A:
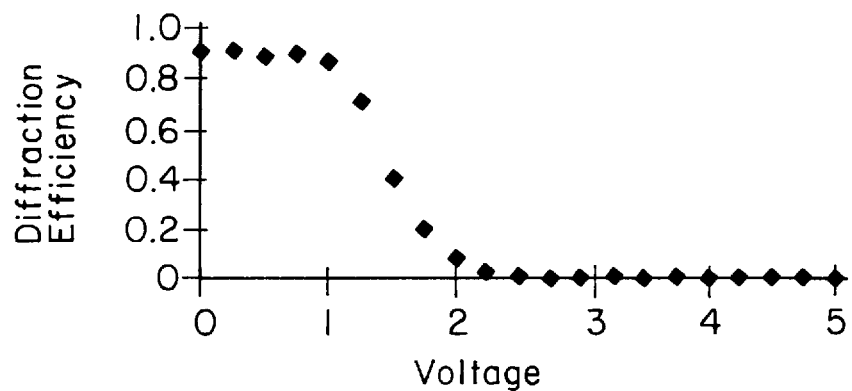
FIGS. 15 A–B are graphs illustrating diffraction efficiencies of reflective optically active diffractive devices using the present invention.
Figure 15B:
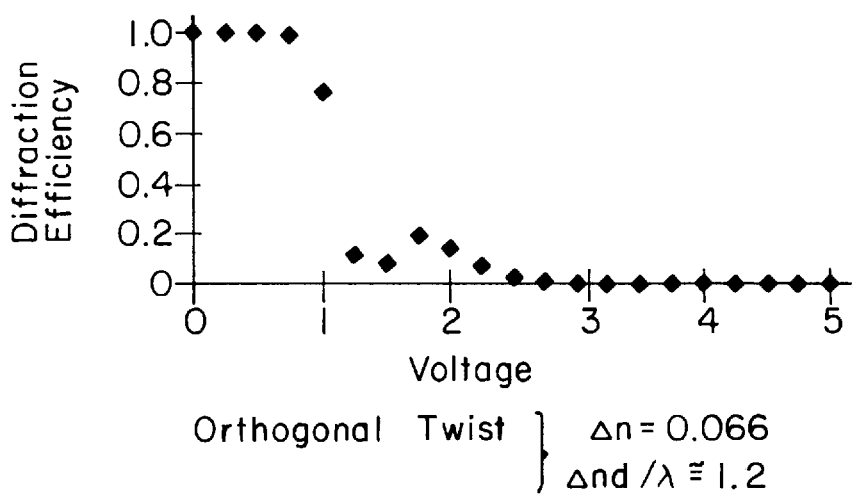

As seen in FIGS. 15 A–B, it has been found that reflective liquid crystal cells using twists (alignment on the two substrates being about crossed for the same domain) that have alignment in adjacent domains crossed have good diffraction efficiency. For example, where values of $\Delta n d/\mu$, are equal to about 1.2, diffraction is 100%. Where the value of $\Delta n d/\mu$ is equal to about 0.45, diffraction efficiency is about 90%.

As will be appreciated from the structure and the examples presented above, the reflective optically active diffractive devices disclosed herein have numerous advantages over known reflective displays. These devices can provide up to nearly 100% diffraction efficiency and polarization independence. Moreover, there is no instability problem of disclination between domains at the full off state. Another advantage of these devices is that they may be used with either positive or negative anisotropic dielectric constant liquid crystal material. Ferro-magnetic liquid crystal materials may also be employed allowing implementation of devices based on magnetic field control. As such, these devices are suitable for use in electrically controllable diffraction gratings and also as a light valve for large screen projection systems for home or theater use.

As with transmissive embodiments, patterning for reflective devices may be done to achieve various manifestations of diffractive optical devices such as, but not limited to, controllable diffraction gratings (including blazed functions), scanners, variable lenses, controllable holograms, diffraction modulators, structured light elements, switches, Bragg type optical structures, wavefront compensators, couplers, fiber optic elements, attenuators and the like. Patterning may be done in regular or irregular arrays of geometric figures such as lines, circles, arcs, squares, rectangular shapes and the like. Patterning may also be achieved with mathematically generated patterns or by photographically, holographically or interferometrically generated structures for either reflective or transmissive structures.

Diffractive Optics

In a manner similar to the displays described above, diffractive optical devices modify the optical path of the light incident on the device to control light transmission or reflection to effect a variety of functions. All of the foregoing aspects and embodiments can be directly applied to creating transmissive or reflective diffractive optical elements in the cells described by simply changing the patterning, and as a result the domain orientations, to those required for the phase front of the diffractive or binary optic to be implemented. One example of a simple transmissive diffractive optic is shown in FIG. 16. In this embodiment, adjacent concentric circles may be patterned using any of the foregoing embodiments to achieve a 180° phase difference between light exiting adjacent circles. The width of the adjacent circles would then vary in accordance with the phase profile of the lens design to be accommodated. This phase profile of the lens design is generated from standard practices by those familiar with the art of diffractive lens design in evaporated or bulk glass materials. This diffractive optic would be implemented in a cell as defined for the previous display embodiments utilizing an ITO coated substrate with alignment layers and liquid crystals applied as to the function to be implemented. Either a lens (transmissive) or a mirror (reflective) could be effected.

Still a further embodiment the invention is provided by defining the cell boundaries or substrates by the faces, surfaces or extents of intrinsic or extrinsic gaps in optical elements such as, but not limited to, optical fibers, integrated optical devices or bulk glass optical elements. This aspect of the invention would describe an embedded diffractive optic or display. A further aspect of this concept would limit the number of domains to one, thereby achieving simpler control functions such as phase compensation, attenuation or fade/gain control. Structures not previously attempted can be accomplished by utilizing the present invention with standard lithography techniques or advanced holographic definition techniques. For example, liquid crystal materials may be placed, as shown in FIGS. 17 A–G, in a small extrinsic gap or connection junction in the fiber path of an integrated fiber optic system and arranged in such a manner as to achieve a wide range of functions with the proper choice of liquid crystal director alignment (orientation and patterning), electrode structure, gap width and liquid crystal material. The liquid crystal materials can be arranged to directly form an optical diffraction grating or structure (lens) in the gap which can be modulated by optical or electrical fields. Variable coupling factor optical attenuators, switches and multiplexers for ray, integrated or fiber optics can be implemented with this invention. A further aspect of this invention would allow for the placement of photodiodes or photoconductors in the optical flux of the light path, which can be connected to the ITO control electrodes for the liquid crystal material to effect a variety of self or external control finctions to be implemented. FIGS. 17 A–C show single domain examples of fiber optic embodiments, while FIGS. 17 D–G illustrate multiple domain patterned structures.

Figure 17A:
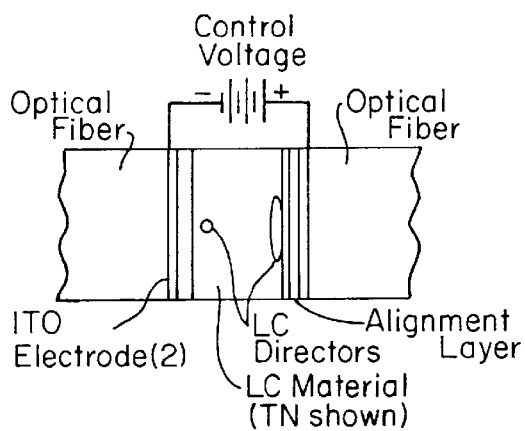
FIGS. 17 A–G are simplified schematic diagrams of fiber optic cell manifestations of the present invention.
Figure 17B:
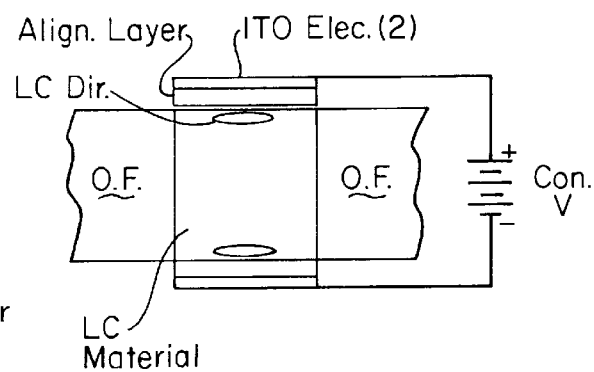
Figure 17C:
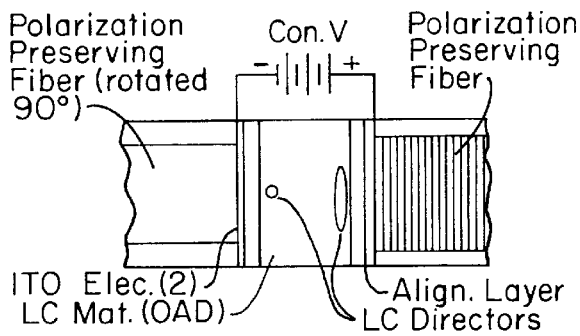
Figure 17D:
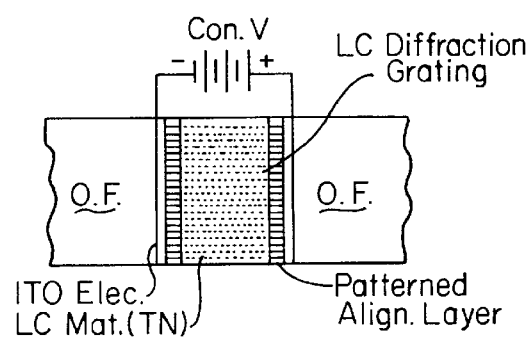

In one embodiment, the liquid crystal cell and electrodes may be placed in the plane of the fiber faces (FIG. 17A), with patterning of the liquid crystal alignment layer applied to implement TN, STN or birefringent alignments to the liquid crystal directors. In another embodiment, the liquid crystal cell and electrodes may be placed orthogonal to the fiber faces as in FIG. 17B to implement similar effects. The structures may be set up to act in transmissive or reflective modes. In yet another embodiment alignment of the liquid crystal material may be patterned in various patterns to implement diffractive lenses or switches as shown in FIGS. 17 D–F. The fiber optic may be either multi-mode, single mode or polarization preserving. If polarization preserving fibers are used, and the fast axes of adjacent fibers are rotated by 90° relative to one another, a very simple, high efficiency fade compensator can be implemented using optically active liquid crystal materials as shown in FIG. 17C.

Further embodiments of the invention are provided when patterned alignment is used in the liquid crystal device to create variable depth of refractive index patterns which can be utilized to achieve electrically controllable Bragg controllable structures for control of wavelength, attenuation or other element characteristics in optical fibers (FIGS. 17 C–F), integrated optics or optical elements. Bragg gratings formed in this manner could be used at various angles determined by the patterning structure to implement monochromator type selection of wavelength. Variable Bragg gratings formed with liquid crystal materials using patterned alignment are not limited to specific utilizations and represent a separate aspect of the invention. Further, the liquid crystal element so formed can be moved internal to a laser's cavity to effect modulation of phase, wavelength, polarization, amplitude, frequency and output coupling as shown in FIG. 17G. The exact effect is determined by the design of the laser cavity elements, the liquid crystal alignment and the orientation of the liquid crystal control electrodes. The liquid crystal compensator so formed could, for instance, adjust the angle of polarization into a Bragg Grating end mirror to control output coupling or adjust the internal path length of the resonator for use with staggered frequency Bragg Grating mirrors. If patterned alignment is used in the liquid crystal device, variable depth of refractive index patterns can be implemented to achieve direct electrically controllable, Bragg grating structures for control of wavelength or other laser characteristics internal to a laser's resonator.

A further aspect of the invention is the ability to electrically alter holograms, holographic optical elements or holographic displays. If the patterning of the multiple domains is done via holographic or interference techniques, such structures as electrically controllable holograms are implementable.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A liquid crystalline diffractive light modulating device comprising nematic liquid crystal material disposed between first and second substrates defining cell walls and including means for addressing said liquid crystal material, said first substrate being treated to provide a plurality of domains in which the liquid crystal adjacent said first substrate in a first of said domains is projected in a different direction than the liquid crystal adjacent said first substrate in a second of said domains, said substrates cooperating with said liquid crystal to form a plurality of liquid crystal domains extending between said first and second substrates wherein the alignment of the liquid crystal adjacent said second substrate is different than the alignment of said liquid crystal adjacent said first substrate, whereby light incident on said first and second domains through one said substrate and in phase, is reflected by the other of said substrates and exits said first and second domains through one said substrate out of phase, irrespective of the polarization of said incident light.

2. The device according to claim 1 wherein, in said first and second domains, there is an approximately 90° difference in the projection on the cell surface of a liquid crystal director of the liquid crystal approximately midway between said substrates, wherein light incident on said first and second domains through one said substrate and in phase, is reflected by the other of said substrates out of phase, irrespective of the polarization of said incident light.

3. The device according to claim 1 wherein said means for addressing said liquid crystal material include a continuous transparent electrode disposed on said first substrate.

4. The device according to claim 1 wherein said domains are arranged in alternating stripes on said first substrate extending substantially across the entire light modulating portion of said device.

5. The device according to claim 1 wherein the liquid crystal adjacent one of said substrates in said first domain is tilted at an angle different than the liquid crystal adjacent said one substrates in said second domain.

6. The device according to claim 1 wherein the liquid crystal adjacent each said first and second substrate are tilted at different angles in each respective domain.

7. The device according to claim 1, wherein the liquid crystal aligned such that the projection of the directors on the cell surface of the liquid crystal adjacent said first substrate in one of said first and second domains are oriented substantially orthogonally to the projection of the directors on the cell surface of the liquid crystal adjacent said first substrate in the other of said domains.

8. The device according to claim 7, wherein the liquid crystal are aligned such that the projection of the directors on the cell surface of the liquid crystal adjacent said second substrate in one of said first and second domains are oriented substantially orthogonally to the projection of the directors on the cell surface of the liquid crystal adjacent said second substrate in the other of said domains.

9. The device according to claim 8, wherein the liquid crystal in said first and second domains have opposite rotational twist sense.

10. The device according to claim 8, wherein the liquid crystal in said first and second domains have the same rotational twist sense.

11. The device according to claim 1 wherein the liquid crystal molecules at the surface of said first substrate in said first and second domains are tilted toward each other, and the liquid crystal molecules at the surface of said second substrate are oriented orthogonal to the liquid crystal molecules adjacent said first substrate and have a first pretilt angle in said first domain and a second pretilt angle different from said first pretilt angle, in said second domain, whereby in said first and second domains the liquid crystal exhibits a twisted nematic liquid crystal structure having opposite twist sense extending between said first and second substrates.

12. The device according to claim 1 wherein the liquid crystal molecules at the surface of said first substrate in said first and second domains are tilted away from each other and the liquid crystal molecules at the surface of said second substrate are oriented orthogonal to the liquid crystal molecules adjacent said first substrate and have a first pretilt angle in said first domain and a second pretilt angle, different from said first pretilt angle, in said second domain, whereby in said first and second domains the liquid crystal exhibits a twisted nematic liquid crystal structure having opposite twist sense extending between said first and second substrates.

13. A liquid crystalline diffractive light modulating device comprising nematic liquid crystal material disposed between first and second substrates defining cell walls and including means for addressing said liquid crystal material, said first substrate being treated to provide a plurality of first and second domains in which the liquid crystal material adjacent said first substrate in a first of said domains is projected in a different direction than the liquid crystal adjacent said first substrate in a second of said domains, said first domain having a first pretilt angle different than a second pretilt angle in said second domain, whereby light incident on said first and second domains through one said substrate and in phase, is reflected by the other of said substrates and exits said first and second domains through the one said substrate out of phase, irrespective of the polarization of said incident light.

14. The device according to claim 13 wherein, in said first and second domains, there is an approximately 90° difference in the projection on the cell surface of the liquid crystal director of the liquid crystal approximately midway between said substrates, whereby light incident on said first and second domains through one said substrate and in phase, is reflected by the other of said substrates out of phase, irrespective of the polarization of said incident light.

15. The device according to claim 13 wherein said domains are arranged in alternating stripes on said first substrate extending substantially across the entire light modulating portion of said device.

16. The device according to claim 13 wherein the liquid crystal molecules at the surface of said first substrate in said first and second domains are tilted toward each other.

17. The device according to claim 13 wherein the liquid crystal molecules at the surface of said first substrate in said first and second domains are tilted away from each other.

18. The device according to claim 13 wherein said means for addressing said liquid crystal material includes a continuous transparent electrode disposed on one of said first and second substrates.

19. The device according to claim 13 wherein said means for addressing said liquid crystal includes an active matrix disposed on said reflective substrate.

20. The device according to claim 13 wherein said first and second pretilt angles are provided with respect to said first substrate.

21. The device according to claim 13 wherein said second substrate being treated to provide said first domain with a third pretilt angle with respect to said second substrate different than a fourth pretilt angle in said second domain with respect to said second substrate.

22. A liquid crystalline diffractive light modulating device comprising nematic liquid crystal material disposed between first and second substrates defining cell walls and including means for addressing said liquid crystal material, said first and second substrates being treated to provide a plurality of domains in which the projection of the directors in a first domain are orthogonal to the projection directors in the second domain, wherein light incident on said first and second domains through one said substrate and in phase, is reflected by the other of said substrates and exits said first and second domains with about a half wave relative phase shift, irrespective of the polarization of said incident light.

23. The device according to claim 22, wherein the liquid crystal projectors adjacent said first substrate in said first domain are substantially orthogonal to the liquid crystal projectors adjacent said first substrate in said second domain and wherein the liquid crystal projectors adjacent said second substrate in said first domain are substantially orthogonal to the liquid crystal directors adjacent said second substrate in said second domain.

24. The device according to claim 23, wherein the liquid crystal projectors in said first and second domains have the same rotational twist sense.

25. The device according to claim 23, wherein the liquid crystal projectors in said first and second domains have opposite rotational twist sense.

26. The device according to claim 22, wherein the liquid crystal projectors in said first and second domains have the same rotational twist sense.

27. The device according to claim 22, wherein the liquid crystal projectors in said first and second domains have opposite rotational twist sense.

28. The device according to claim 22 wherein said means for addressing said liquid crystal material include a continuous transparent electrode disposed on said first substrate.

29. The device according to claim 22 wherein said domains are arranged in alternating stripes on said first substrate extending substantially across the entire light modulating portion of said device.

30. The device according to claim 22 wherein the liquid crystal in each said first and second domain adjacent said first substrate is tilted at an angle of from about 0.5° to about 25° with respect to said substrate.

31. The device according to claim 22 wherein the liquid crystal in each said first and second domain adjacent each said first and second substrate are tilted at an angle of from about 0.5° to about 25° with respect to said substrate.

32. The device according to claim 22 wherein said means for addressing said liquid crystal includes an active matrix disposed on said second substrate.

33. A method of making a liquid crystalline diffractive device comprising:
   a) providing first and second substrates to define cell walls, and including means for addressing a liquid crystal material;
   b) treating said first substrate with a first alignment layer to provide at least first and second domains adapted to promote different orientations of a liquid crystal material in said domains;
   c) treating said second substrate with a second alignment layer adapted to promote an orientation of a liquid crystal adjacent said second substrate that is different than the orientation promoted by said first and second domains of said first substrate, and to cooperate with said first alignment layer and a liquid crystal disposed therebetween, to produce liquid crystal domains extending between said substrates; and,
   d) disposing a nematic liquid crystal material between said substrates to form liquid crystal domains extending between said substrates,
   whereby light incident on said first and second domains through one said substrate and in phase, is reflected by the other of said substrates and exits said first and second domains through one said substrate out of phase.

34. The method according to claim 33 comprising treating said first substrate such that said first and second domains of said first alignment layer promote a homogeneous or a tilted homeotropic alignment of adjacent liquid crystal molecules in which said molecules in said first and second domains tilt in the opposite directions.

35. The method according to claim 33 comprising treating said first substrate such that said first and second domains of said first alignment layer promote a homogeneous or a tilted homeotropic alignment of adjacent liquid crystal molecules in which the projection on the cell surface of the directors of said molecules in said first and second domains are orthogonal.

36. The method according to claim 33 comprising treating said first substrate wherein the liquid crystal molecules are aligned such that the projection of the directors on the cell surface of the liquid crystal adjacent said first substrate in one of said first and second domains are oriented substantially orthogonally to the projection of the directors on the cell surface of the liquid crystal adjacent said first substrate in the other of said domains.

37. The method according to claim 36, comprising treating said second substrate wherein the liquid crystal molecules are aligned such that the projection of the directors on the cell surface of the liquid crystal adjacent said second substrate in one of said first and second domains are oriented substantially orthogonally to the projection of the directors on the cell surface of the liquid crystal adjacent said second substrate in the other of said domains.

38. The method according to claim 37, further comprising treating said substrates wherein the liquid crystal molecules in said first and second domains have opposite rotational twist sense.

39. The method according to claim 37, further comprising treating said substrates wherein the liquid crystal molecules in said first and second domains have the same rotational twist sense.

40. The method according to claim 37 wherein said treating of said first substrate comprises coating said substrate with polyimide, unidirectionally rubbing said substrate, masking at least a portion of said substrate and, thereafter, unidirectionally rubbing said substrate in the opposite direction.

41. The method according to claim 37 wherein said treating of said first substrate comprising obliquely evaporating a silicon oxide onto the surface of said substrate, masking at least a portion of said substrate and, thereafter, obliquely evaporating said silicon oxide the opposite direction to said first evaporation.

42. A method of making a liquid crystalline diffractive device comprising:
   a) providing first and second substrates to define cell walls, and including means for addressing a liquid crystal material;
   b) treating said first substrate with a first alignment layer to provide a plurality of domains in which a first said domain will promote an orientation of a liquid crystal material in said first domain orthogonally to a liquid crystal orientation promoted by said second domain;
   c) treating said second substrate with a second alignment layer adapted to cooperate with said first alignment layer and a liquid crystal disposed therebetween, to produce first and second twisted nematic liquid crystal domains having opposite twist sense extending between said substrates; and,
   d) disposing a nematic liquid crystal material between said substrates to form first and second liquid crystal domains extending between said substrates in which the projection of the directors on the substrate surface, of the liquid crystal in said first and second domains is substantially orthogonal,
   whereby light incident on said first and second domains through one said substrate and in phase, is reflected by the other of said substrates and exits said first and second domains through the one said substrate out of phase.

43. The method according to claim 42 wherein said second substrate is treated to promote homeotropic alignment of said liquid crystal material.

44. The method according to claim 42 wherein said treating of said first substrate comprises coating said substrate with polyimide, unidirectionally rubbing said substrate, masking at least a portion of said substrate and, thereafter, unidirectionally rubbing said substrate in a direction perpendicular to said first rub.

45. The method according to claim 42 wherein said treating of said first substrate comprising obliquely evaporating a silicon oxide of the formula $SiO_x$, wherein x is an integer from one to three, onto the surface of said substrate, masking at least a portion of said substrate and, thereafter, obliquely evaporating said silicon oxide orthogonally to said first evaporation.

46. The method according to claim 42 comprising treating said first substrate wherein the liquid crystal molecules are aligned such that the projection of the directors on the cell surface of the liquid crystal adjacent said first substrate in one of said first and second domains are oriented substantially orthogonally to the projection of the directors on the cell surface of the liquid crystal adjacent said first substrate in the other of said domains.

47. The device according to claim 42, comprising treating said second substrate wherein the liquid crystal molecules are aligned such that the projection of the directors on the cell surface of the liquid crystal adjacent said second substrate in one of said first and second domains are oriented substantially orthogonally to the projection of the directors on the cell surface of the liquid crystal adjacent said second substrate in the other of said domains.

48. The device according to claim 47, further comprising treating said substrates wherein the liquid crystal molecules in said first and second domains have opposite rotational twist sense.

49. The device according to claim 47, further comprising treating said substrates wherein the liquid crystal molecules in said first and second domains have the same rotational twist sense.

50. A method of making a liquid crystalline diffractive device comprising:
   a) providing first and second substrates to define cell walls, and including means for addressing a liquid crystal material;
   b) treating said first substrate with a first alignment layer to provide a plurality of domains in which a first said domain will promote a first pretilt orientation of said liquid crystal material and a second pretilt orientation of said liquid crystal material, different than said first pretilt orientation in said second domain;
   c) treating said second substrate with a second alignment layer adapted to cooperate with said first alignment layer and a liquid crystal disposed therebetween, to produce first and second twisted nematic liquid crystal domains having opposite twist sense extending between said substrates; and,
   d) disposing a nematic liquid crystal material between said substrates to form first and second liquid crystal domains extending between said substrates in which the projection of the directors on the substrate surface, of the liquid crystal in said first and second domains is substantially orthogonal,
   whereby light incident on said first and second domains through one said substrate and in phase, is reflected by the other of said substrates and exits said first and second domains through the one said substrate out of phase.

51. The method according to claim 50 wherein by treating said first substrate, said first and second pretilt orientations are provided with respect to said first substrate.

52. The method according to claim 51 wherein by treating said second substrate in said first domain a third pretilt orientation with respect to said second substrate different than a fourth pretilt angle in said second domain with respect to said second substrate is provided.

53. A liquid crystalline diffractive light modulating device comprising nematic liquid crystal material disposed between first and second substrates defining cell walls, wherein at least one of said substrates is transparent and including means for addressing said liquid crystal material, said first substrate being treated to provide a plurality of domains in which the liquid crystal adjacent said first substrate in a first of said domains is projected in a different direction than the liquid crystal adjacent said first substrate in a second of said domains, said substrates cooperating with said liquid crystal to form a plurality of liquid crystal domains extending between said first and second substrates wherein the alignment of the liquid crystal adjacent said second substrate is different than the alignment of said liquid crystal adjacent said first substrate, whereby light incident on said first and second domains through one said substrate and in phase, exits said first and second domains through one of said substrates out of phase, irrespective of the polarization of said incident light.

54. The device according to claim 53 wherein said first substrate is substantially parallel with one end of an optical fiber and said second substrate is substantially parallel with one end of a second optical fiber.

55. The device according to claim 53 wherein said first and second substrates are substantially orthogonal with respect to ends of optical fibers.

56. A method of making a liquid crystalline diffractive device comprising:

a) providing first and second substrates to define cell walls, wherein one of said first and second substrates is transparent and including means for addressing a liquid crystal material;

b) treating said first substrate with a first alignment layer to provide at least first and second domains adapted to promote different orientations of a liquid crystal material in said domains;

c) treating said second substrate with a second alignment layer adapted to promote an orientation of a liquid crystal adjacent said second substrate that is different than the orientation promoted by said first and second domains of said first substrate, and to cooperate with said first alignment layer and a liquid crystal disposed therebetween, to produce liquid crystal domains extending between said substrates; and, d) disposing a nematic liquid crystal material between said substrates to form liquid crystal domains extending between said substrates, whereby light incident on said first and second domains through one of said substrates and in phase, exits said first and second domains through one of said substrates out of phase.

57. The method according to claim 56 further comprising the step of disposing one of said substrates adjacent to one end of an optical fiber and the other of said substrates adjacent one end of a second optical fiber.

58. The method according to claim 56 further comprising the step of disposing orthogonally with respect to the ends of optical fibers.

* * * * *